(12) United States Patent
Wilkinson

(10) Patent No.: US 6,615,602 B2
(45) Date of Patent: Sep. 9, 2003

(54) HEAT PUMP WITH SUPPLEMENTAL HEAT SOURCE

(76) Inventor: Ken Wilkinson, 3680 Seltise Way, Unit B, Post Falls, ID (US) 83854

( * ) Notice: Subject to any disclaimer, the term of this patent is extended or adjusted under 35 U.S.C. 154(b) by 0 days.

(21) Appl. No.: 09/863,544

(22) Filed: May 22, 2001

(65) Prior Publication Data

US 2002/0174673 A1 Nov. 28, 2002

(51) Int. Cl.[7] .............................................. F25B 27/00
(52) U.S. Cl. ........................ 62/238.7; 62/260; 62/186
(58) Field of Search .......................... 62/238.6, 238.7, 62/160, 260, 177, 178, 179, 180, 181, 182, 183, 184, 185, 186

(56) References Cited

U.S. PATENT DOCUMENTS

| | | | | |
|---|---|---|---|---|
| 3,563,304 A | * | 2/1971 | McGrath ................ 62/238.6 X |
| 3,986,344 A | * | 10/1976 | Newman .................. 62/260 X |
| 4,257,239 A | * | 3/1981 | Partin et al. .............. 62/260 X |
| 4,493,193 A | * | 1/1985 | Fisher .................... 62/238.7 X |
| 4,798,056 A | | 1/1989 | Franklin .................... 62/238.6 |
| 5,142,882 A | | 9/1992 | Vandenberg ................ 62/235 |
| 5,852,939 A | * | 12/1998 | Gazes ........................ 62/260 |
| 6,138,744 A | | 10/2000 | Coffee .......................... 165/45 |
| 6,167,715 B1 | * | 1/2001 | Hebert ........................ 62/260 |

* cited by examiner

Primary Examiner—Harry B. Tanner
(74) Attorney, Agent, or Firm—John S. Reid; Reidlaw, L.L.C.

(57) ABSTRACT

A heat pump includes a compressor having an inlet and an outlet, an indoor heat exchanger and an outdoor heat exchanger, and an outdoor thermal expansion valve. The heat pump further includes an auxiliary heat exchanger. An auxiliary fluid line and an auxiliary fluid pump circulate an auxiliary heat transfer fluid through the auxiliary fluid line. The compressor outlet, the indoor heat exchanger, the outdoor thermal expansion valve, the auxiliary heat exchanger, the outdoor heat exchanger, and the compressor inlet can be placed in respective serial fluid communication to thereby circulate a refrigerant fluid through the heat pump. The auxiliary heat exchanger is configured to exchange heat between the refrigerant fluid and the auxiliary heat transfer fluid. The auxiliary fluid line is in thermal energy communication with a primary source of auxiliary heat. Preferably, the primary source of auxiliary heat is a fluid contained within a septic tank.

2 Claims, 12 Drawing Sheets

HEAT PUMP WITH SUPPLEMENTAL HEAT SOURCE

FIELD OF THE INVENTION

The invention claimed and disclosed herein pertains to environmental climate control systems, and particularly to heat pumps for commercial or residential use.

BACKGROUND OF THE INVENTION

A common environmental conditioning system (i.e., a heating, ventilation and air-conditioning, or "HVAC" system) is the heat pump. The heat pump essentially uses a refrigeration cycle to move heat energy from a first environment to a second environment. The system is called a "heat pump" because the temperature of the first environment is lower than the temperature of the second environment, and so the natural direction of heat transfer would be from the second environment to the first environment The heat pump reverses this natural flow of heat by "pumping" the heat energy from a colder, first environment to a warmer, second environment. So long as there is at least some energy in the first environment, and an appropriate heat transfer fluid is selected, it is possible to transfer heat against the natural direction of heat transfer. The advantage of using a heat pump is that it can consume less energy to perform the heat transfer process than would be used to directly heat the first environment For example, if electricity is used to operate a heat pump to heat a first space, and the alternative is to heat the space with an efficient electrical heater, then the heat pump will typically consume less energy than would be used to directly heat the space using the electrical heater. A heat pump can be an attractive source of heating and cooling an indoor environmental space where the outdoor temperature does not reach extreme lows in the winter, and where the cost of electrical energy (used to operate a compressor and a fan in the heat pump) is not too high. When the cost of electricity becomes very high, then heating with natural gas may be a more economical alternative. However, where natural gas is not available (for example, in a rural or a remote setting), then a heat pump can be an attractive source of environmental heating and cooling even where the cost of electricity is relatively high.

Heat pumps are typically configured to operate in one of two modes: a summer mode and a winter mode. (These modes are alternately, and respectively, known as "cooling mode" and "heating mode".) In the winter mode, the heat pump moves energy from a source of energy to an indoor environment, such as a residence or a commercial building. In the summer mode, the heat pump moves energy from the indoor environment to another location. Many heat pumps are configured to be able to switch from one mode to the other. Thus, the heat pump can act to heat an indoor environment in the winter, and cool the same indoor environment in the summer. Known sources of energy that can be accessed by the heat pump for winter mode include solar heat, ground or earth heat, ambient air, water (such as a river), and waste heat. Waste heat is more common in an industrial environment where heat from commercial processes (such as incineration) can be accessed. If the heat pump is to be used in the summer mode, then the objective becomes locating a destination to which heat from the indoor environment can be transferred. Obviously, for winter mode it is preferable to locate a source of energy having a large amount of available energy, such as solar energy. For summer mode, it is preferable to identify a location to which the indoor heat can be pumped which is relatively cool and will thus accept a large amount of heat. If the heat pump is configured to be capable of switching between modes, then it is preferable to locate a source which can provide heat for the winter mode, yet accept heat in the summer mode. The most common source is to use the outside ambient (or atmospheric) air. In this case, the heat pump is known as an air-to-air heat pump, since it moves heat between the air in the indoor environment and the air in the outdoor atmosphere.

A basic schematic of a heat pump 5 is depicted in FIG. 1A, and the basic thermal cycle of the heat pump is depicted in FIGS. 1B and 1C. FIG. 1A actually depicts a refrigeration configuration, but it can be considered as one or the other modes of a heat pump, depending on whether the heat exchanger which is located in the indoor environment is acting as the condenser (heating mode), or an evaporator (cooling mode). The "heat pump" 5 thus comprises a condenser 10 (between points (4) and (1)), an expansion valve 20 (between points (1) and (2)), an evaporator 30 (between points (2) and (3)), and a compressor 40 (between points (3) and (4)). A refrigerant in vapor form is passed through the condenser 20. Heat is extracted from the vapor, causing a temperature drop and a loss in enthalpy "h" between points (4) and (1) (see FIGS. 1B and 1C). As the vapor is passed through the condenser 10, it condenses to a liquid. The liquid refrigerant is then passed through the expansion valve 20 where it is flashed to a vapor, lowering the temperature of the refrigerant (see FIG. 1B between points 1 and 2). The cooled, vaporized refrigerant is then passed through the evaporator 30 where heat in the form of enthalpy "h" is added to the refrigerant (see FIG. 1C between points 2 and 3). Note that very little (or no) temperature rise in the refrigerant occurs as the refrigerant passes through the evaporator (see FIG. 1B between points 2 and 3). The refrigerant vapor then passes through the compressor 40, where heat in the form of sensible heat (indicated by a rise in temperature T, as indicated in FIG. 1B between points 3 and 4), as well as enthalpy (FIG. 1C, between points 3 and 4) is added to the refrigerant. The pressure of the refrigerant is also increased, providing a motive source to circulate the refrigerant through the system 5.

Turning to FIG. 1, a prior art air-to-air heat pump is depicted in a schematic diagram. The heat pump 100 is depicted as operating in the winter "heating" mode. The heat pump uses a heat transfer fluid or refrigerant (not shown) which flows in the various fluid lines in order to transfer heat from an outdoor atmosphere "A" to an indoor environment "E". A common refrigerant used in such heat pumps is a refrigerant known as "R-22". The refrigerant is selected to have a flash point above the coldest anticipated outdoor temperature so that the refrigerant will still flash from a liquid to a vapor and thus absorb heat, as will be explained below.

The heat pump 100 comprises an indoor unit 102 and an outdoor unit 104. The indoor unit is located in the environment to be heated (such as a residence or an office building), and the outdoor unit is typically located out of doors and has access to the outdoor atmosphere. The indoor unit 102 comprises an indoor heat exchanger 108 comprising a series of coils or passes of fluid line through which the refrigerant passes. The coils are exposed to air from the indoor environment which is forceably passed over the coils by a blower 110. If a fluid in the coils 108 is at a temperature higher than the temperature of the environment "E", then heat energy from the coils 108 will be transferred to the environment air. The indoor unit 102 can further comprise a secondary heat source such as electrical heating element 111 which can be used to augment the heat from the coils 108. In the heating mode depicted in FIG. 1, the exchanger 108 acts as a condenser such that the refrigerant enters the top of the exchanger 108 through line 106 as a vapor. As the environmental air is passed over the coils and heat is extracted from the refrigerant, the refrigerant condenses to a liquid and passes out of the bottom of the exchanger via the distributor 112. The liquid refrigerant then passes through the check valve 114 and into the line 120. Although a small amount of refrigerant may also pass through the TEV 116, the bulk of the liquid refrigerant will pass through the check valve 114.) The indoor unit is also provided with an indoor thermal expansion valve ("TEV") 116 and a drier 118, which are used in the cooling cycle, as will be described below with respect to FIG. 2. The check valve 114 allows fluid to flow out of the exchanger 108 and into line 120, but does not allow fluid to pass from line 120 into the exchanger 108, other than through the TEV 116. That is, for fluid to flow from line 120 into the exchanger 108, it must pass through the thermal expansion valve 116. The general direction of flow of the refrigerant in the heat pump 100 during the heating cycle is depicted by flow arrows adjacent to the various fluid lines in the figure.

The liquid refrigerant passes from the line 120 into the outdoor unit 104. The liquid refrigerant then passes through a drier 122 where water can be removed from the refrigerant. The refrigerant then passes through the outdoor unit thermal expansion valve (or "TEV") 124 and then into the distributor 126, where the refrigerant is distributed to two coils in the outdoor heat exchanger 130. Outdoor atmospheric air "A" is passed over the coils of the exchanger 130 by fan 132 which is driven by electrical motor 134.

A check valve 128, which is in parallel with TEV 124, prevents the refrigerant from bypassing the TEV 124 and flowing directly into the outdoor exchanger 130. (When the refrigerant circulates in the opposite direction, the outdoor check valve 128 allows fluid to flow from the outdoor exchanger 130 into line 120. Although a small amount of refrigerant may also pass through the TEV 124, the bulk of the liquid refrigerant will pass through the check valve 128.) For fluid to flow from line 120 into the exchanger 130, it must pass through the thermal expansion valve 124. The thermal expansion valve 124 causes a pressure drop between the fluid line 120 and the coils of the exchanger 130. This pressure drop causes the liquid refrigerant entering the TEV 124 to flash to a vapor. The vaporization process removes a substantial amount of energy from the refrigerant, causing it to drop to a temperature below the temperature of the atmospheric air "A" which is passed over the coils of the exchanger 130. Thus, the vapor refrigerant in the exchanger 130 can receive heat energy from the atmospheric air "A", even though the temperature of the atmospheric air "A" is below the temperature of the indoor environment "E". Thus, in the heating cycle depicted in FIG. 1, the outdoor exchanger 130, in combination with TEV 124, becomes an evaporator. FIG. 1C shows that the heat input into the refrigerant in the evaporator 130 is input in the form of enthalpy "h" (versus sensible heat, which would be indicated by a rise in temperature).

The vapor refrigerant passes from exchanger 130 via line 136, through a reversing valve 138. The reversing valve 138 can be used to reverse the direction of flow of the refrigerant in the heat pump 100. This is done to allow the heat pump 100 to act in both a heating mode and a cooling mode, as will be described further below. From the reversing valve 138 the refrigerant (still in vapor form) passes into an accumulator 140. The accumulator essentially allows only vapor refrigerant to pass out of the accumulator 140, and traps entrained liquid refrigerant. (Liquid refrigerant can be formed in passing from exchanger 130 to the accumulator 140 as a result of a drop in temperature). The vapor refrigerant passes out of the accumulator 140 and into the suction side 181 of a compressor 142. The compressor raises the pressure (and consequently, the temperature (see FIG. 1B between points 3 and 4)) of the vapor refrigerant, and also provides the motive force for the refrigerant to circulate through the heat pump 100. As can be seen, high-pressure vapor refrigerant is discharged from the compressor 142 into line 143, where it then passes into line 106 of the indoor unit, to repeat the process of heat extraction described above. The heat absorbed by the refrigerant in the outdoor exchanger 130 is thus transferred to the indoor unit 102, where it is extracted in the exchanger 108 and transferred to the indoor environment "E".

Turning to FIG. 2, the heat pump 100 of FIG. 1 is depicted in a cooling (or "summer") mode. In this mode, rather than transferring heat from the atmosphere "A" to the indoor environment "E", heat is transferred from the indoor environment "E" to the outdoor atmosphere "A" to thus cool the environmental space "E". The primary difference between these two modes is facilitated by the reversing valve 138, which is depicted in a different position in FIG. 2 than is depicted in FIG. 1. This causes the refrigerant to circulate in the opposite direction in the heat pump, as indicated by the circulation arrows drawn next to the fluid lines. Note that the refrigerant now passes through the indoor TEV 116 (and not the check valve 114) on the indoor side, and on the outdoor side the refrigerant passes through the check valve 128, and not the outdoor TEV 124. ( Although a small amount of refrigerant may also pass through the TEV 124, the bulk of the liquid refrigerant will pass through the check valve 128.) Simply put, in the cooling mode the indoor heat exchanger 108 become the evaporator, and the outdoor exchange 130 becomes the condenser. Thus, a low pressure refrigerant, in vapor form, is compressed by the compressor 142, and experiences a rise in temperature (as well as pressure). The compressed refrigerant vapor is then passed (via the reversing valve 138) to the outdoor exchanger 130, where atmospheric air is passed over coils containing the refrigerant. The refrigerant is cooled by the flow of air over the coils, and condenses to a liquid. The liquid refrigerant then passes, via the outdoor check valve 128 and line 120, through the indoor expansion valve (TEV) 116, where it flashes to a vapor, and the enthalpy of the refrigerant drops. The refrigerant vapor then passes through the indoor exchanger 108, where air from the indoor environment is passed over the coils of the exchanger. Since the refrigerant in the coils of exchanger 108 is lower than the temperature of the air in the environment "E", the refrigerant absorbs heat from the indoor air, thus cooling the indoor air. The cooled refrigerant vapor then passes back to the compressor 142, where it is compressed and the cycle begins anew.

As mentioned previously, one of the drawbacks to using a heat pump is that in situations wherein the outdoor temperature can become extremely cold in the winter (such as in Alaska), there may be insufficient heat in the atmospheric air to justify the use of the heat pump. That is, more energy is used to operate the heat pump than would be used to heat the environmental space directly. Also, in the face of rising electrical energy costs, alternative methods of heating (such as by using natural gas) may become less expensive than using a heat pump.

Yet another problem with prior art heat pumps is that in the winter, when the heat pump is operated in a heating mode and thermal energy is extracted from the outdoor atmospheric air, the drop in temperature of the atmospheric air as it passes over the coils of the outdoor exchanger 130 can cause moisture in the atmospheric air to condense on the coils. If the temperature on the coils is below the freezing point (about 32° F., or 0° C.), then ice forms on the coils of the outdoor exchanger. This ice will reduce the efficiency of the outdoor exchanger (i.e., the ability to transfer heat from the atmospheric air to the refrigerant in the coils). One solution to this problem is to temporarily reverse the cycle of the heat pump, and essentially put the heat pump in the cooling mode of FIG. 2. In this case heat is transferred from the indoor environment to the outdoor exchanger 130, causing the ice on the coils 108 to melt. This is known as a defrost cycle of the heat pump. This has the obvious detriment that it results in a cooling of the very environmental space which is trying to be heated. An alternative solution is to temporality heat the coils of outdoor exchanger 130 using an electrical heating element. The obvious drawback here is the use of additional electrical energy.

What is needed then is a heat pump which achieves the benefits to be derived from similar prior art devices, but which avoids the shortcomings and detriments individually associated therewith.

SUMMARY OF THE INVENTION

The present invention provides for a heat pump comprising a compressor having a compressor inlet and a compressor outlet, an indoor heat exchanger and an outdoor heat exchanger, and an outdoor thermal expansion valve. The heat pump further includes an auxiliary heat exchanger. An auxiliary fluid line and an auxiliary fluid pump circulate an auxiliary heat transfer fluid through the auxiliary fluid line. The compressor outlet, the indoor heat exchanger, the outdoor thermal expansion valve, the auxiliary heat exchanger, the outdoor heat exchanger, and the compressor inlet can be placed in respective serial fluid communication to thereby circulate a refrigerant fluid through the heat pump. The auxiliary heat exchanger is configured to exchange heat between the refrigerant fluid and the auxiliary heat transfer fluid. The auxiliary fluid line is in thermal energy communication with a primary source of auxiliary or supplemental heat. Preferably, the primary source of auxiliary heat is a fluid contained within a septic tank. The primary source of heat can also be the earth. In this way, when the heat pump is operating in the heat mode, supplemental heat can be provided to elevate the saturated suction temperature of the refrigerant at the compressor inlet, thereby providing more energy to be transferred to an indoor environment.

In one variation the heat pump is provided with a reversing valve allowing the heat pump to operate in a cooling mode as well as a heat mode. In this case the heat pump further includes an indoor thermal expansion valve, an indoor check valve in parallel fluid arrangement with the indoor thermal expansion valve, and an outdoor check valve in parallel fluid arrangement with the outdoor thermal expansion valve. The reversing valve is in fluid communication with the compressor outlet, and can be moved between two positions. In the first position (the heating mode) the compressor outlet is directed to the indoor heat exchanger. This puts the compressor outlet, the indoor heat exchanger, the indoor check valve, the outdoor thermal expansion valve, the auxiliary heat exchanger, the outdoor heat exchanger, and the compressor inlet in respective serial fluid communication with one another. In the second position, the compressor outlet is directed to the outdoor heat exchanger. This puts the compressor outlet, the outdoor heat exchanger, the auxiliary heat exchanger, the outdoor check valve, the indoor thermal expansion valve, the indoor heat exchanger, and the compressor inlet in respective serial fluid communication with one another.

In yet another variation, when the heat pump includes the reversing valve, the auxiliary fluid line can be configured to be in further thermal energy communication with a secondary source of auxiliary heat, such as solar energy. The heat pump can then include a solar energy isolation valve which can isolate the auxiliary heat transfer fluid line from the solar energy. In this way, solar energy can be used to augment the heating cycle, but can be isolated from the heat pump system during the cooling cycle. Further, in the summer (i.e., when cooling of the indoor environment is desired) the septic tank may be at a temperature below the temperature of the atmospheric air, in which case the septic tank can also be used to augment the cooling cycle.

Another variation on the present invention allows for an improved defrost cycle over prior art heat pumps. When the heat pump includes the reversing valve, a three-way defrost valve can be disposed between the outdoor heat exchanger and the auxiliary heat exchanger. A defrost line is placed in fluid communication with the compressor inlet. The three-way defrost valve is selectable to a first position to place the auxiliary heat exchanger and the defrost line in fluid communication for a defrost cycle. The three-way defrost valve is also selectable to a second position to place the auxiliary heat exchanger and the outdoor heat exchanger in fluid communication for the normal heating cycle.

The present invention also provides for a heat pump which can use heat extracted from an environmental space by the heat pump to preheat water, such as water used in a residential hot water system. Not only is there an efficiency in preheating the water, but this also has the effect of lowering the temperature of the refrigerant, allowing the refrigerant to extract more heat from the indoor environmental space. In this variation the heat pump is provided with the reversing valve described above, as well as a water preheat heat exchanger configured to transfer heat between the auxiliary heat transfer fluid and water. The water preheat heat exchanger has a preheat exchanger inlet and a preheat exchanger outlet for the auxiliary heat transfer fluid. The heat pump is further provided with a three-way water preheat inlet valve disposed in the auxiliary fluid line and selectable to a first position to direct the auxiliary heat transfer fluid from the auxiliary heat exchanger to the preheat exchanger inlet. The three-way water preheat inlet valve is also selectable to a second position to direct the auxiliary heat transfer fluid from the auxiliary heat exchanger to the primary source of auxiliary heat. That is, in the first position the water preheat cycle is used. This typically corresponds to the cooling cycle of the heat pump, used in the summer. However, during the cooling cycle, the water preheat system is disengaged to avoid chilling of the water in the water preheat exchanger (and consequently, the refrigerant in the heat pump).

These and other aspects and embodiments of the present invention will now be described in detail with reference to the accompanying drawings, wherein:

DETAILED DESCRIPTION OF THE INVENTION

The present invention provides for a method of increasing the amount of heat which a heat pump can transfer to an indoor environment, thus making a heat pump a more attractive alternative to heating in situations where a prior art heat pump may not be an option, such as where outdoor temperatures are extremely cold in the winter, or where the cost of electrical energy is high. The present invention also can allow for a reduction in the electrical energy consumed by prior art a heat pump. Further, the present invention also provides for improved cooling of an indoor environment using a heat pump, and other efficient uses of energy, as will be explained in the following discussion.

Essentially, a heat pump in accordance with the present invention uses an auxiliary source of available heat, or an auxiliary heat sink (cooling source), to improve the performance of the heat pump. Preferably, the auxiliary source of available heat, and the auxiliary heat sink, are the same source. More preferably, this combined source of heat and cooling is a source which is essentially normally available in a residential or commercial setting, and which does not require additional cost to heat or cool. Specifically, the preferred source of auxiliary heating and cooling is a septic tank. An additional source of solar energy can be used to augment the heating cycle of the heat pump. Further, a water preheat (for a hot water source such as a hot water heater) can be used to augment the cooling cycle of the heat pump.

Figure 1:
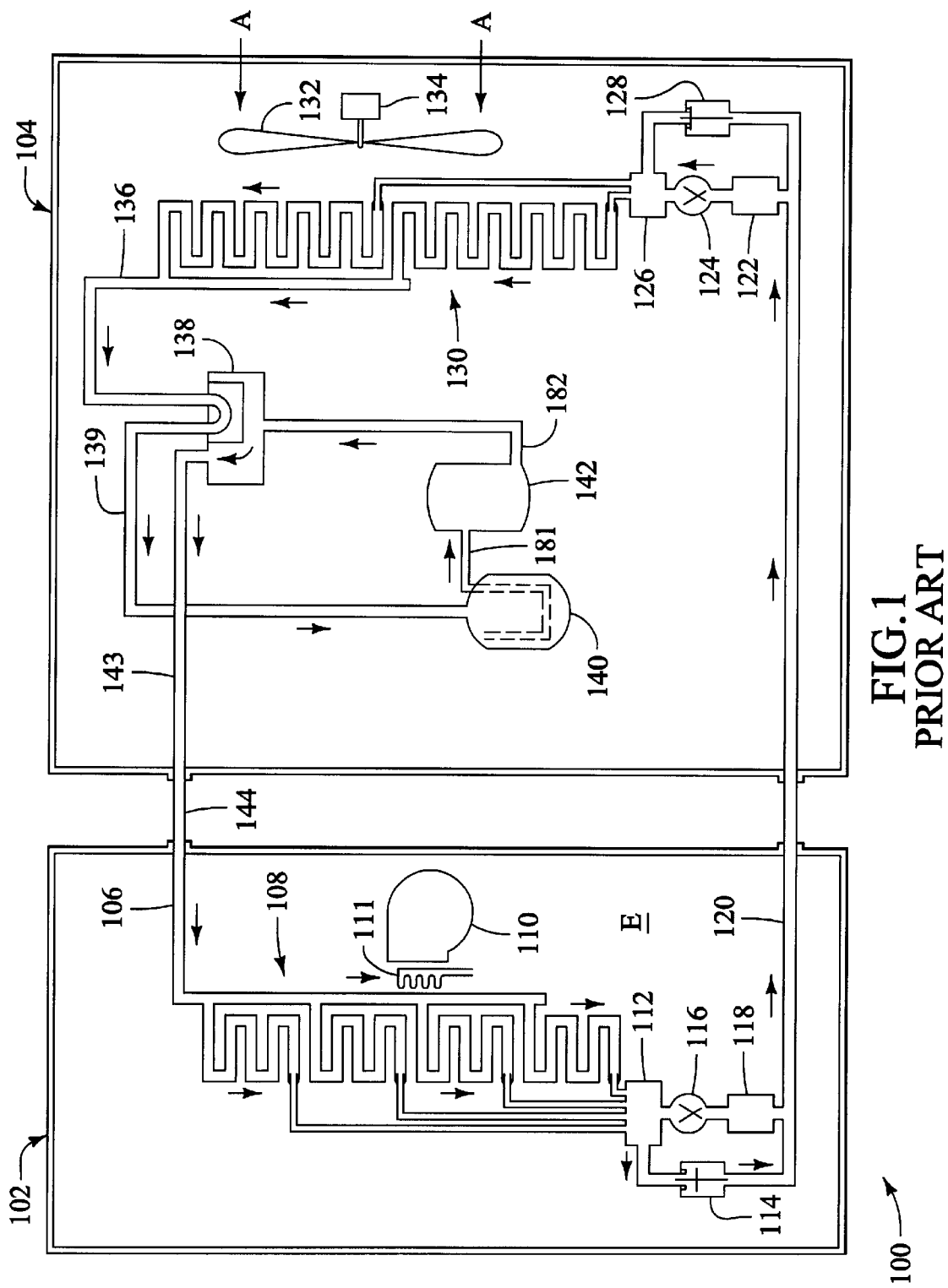
FIG. 1 is a schematic diagram of a prior art heat pump in a heating mode.
Figure 2:
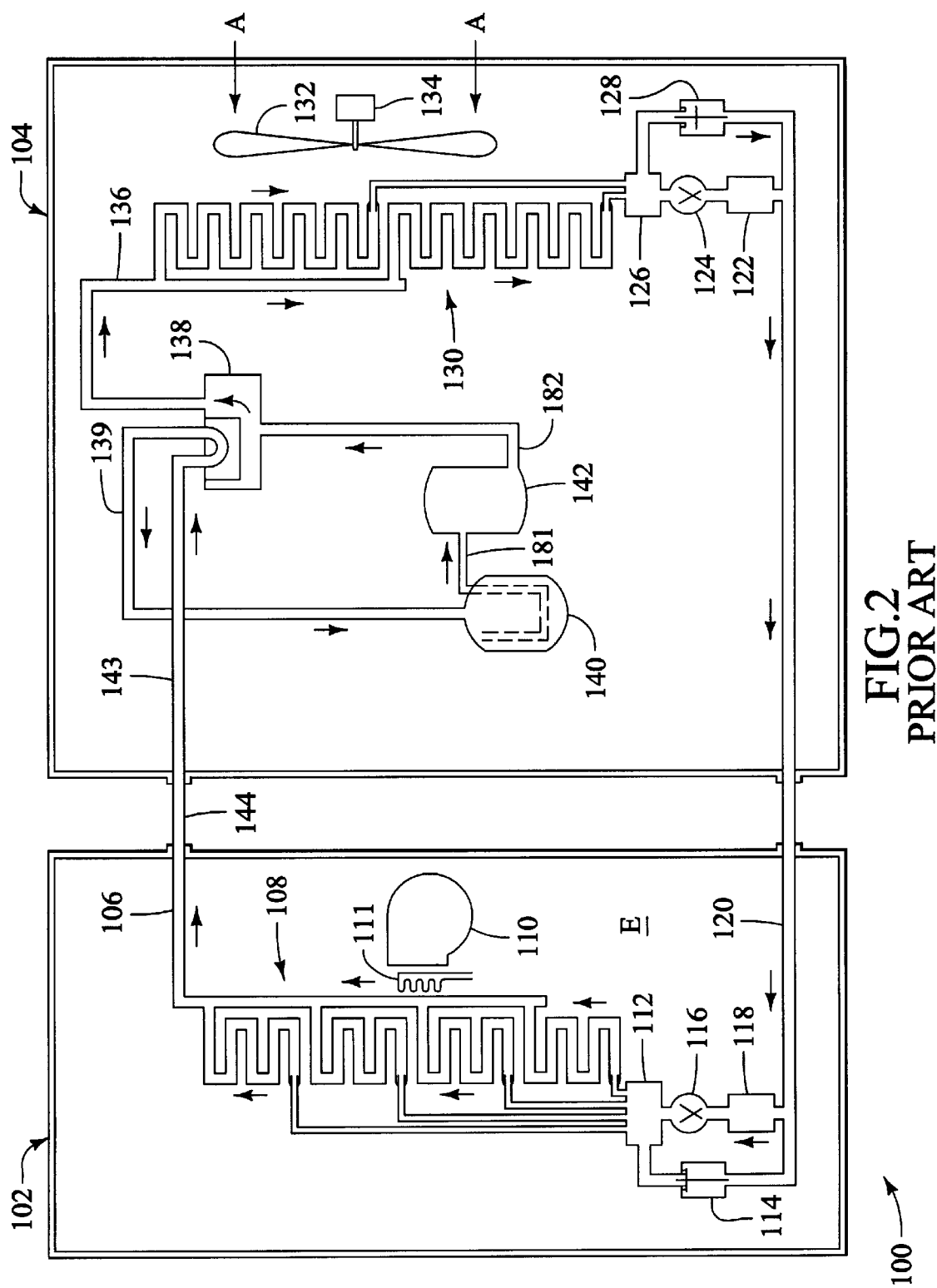
FIG. 2 is a schematic diagram of the prior art heat pump of FIG. 1, but in a cooling mode.

In the following discussion I will refer to a heat pump as being in a "heat mode", a "heating mode", a "heat cycle", a "heating cycle", or a "summer mode". All of these terms refer to the general cycle depicted in prior art FIG. 1, wherein the heat pump is used to extract heat from the atmosphere "A" and expel it to an environmental space "E", such as a residence or an office building. Likewise, I will also refer to a heat pump being in a "cool mode", a "cooling mode", a "cool cycle", a "cooling cycle", or a "winter mode". All of these terms refer to the general cycle depicted in prior art FIG. 2, wherein the heat pump is used to extract heat from an environmental space "E", and expel it to the atmosphere "A". I will also use the term "indoor" to describe the general location of, or association with, the environmental space which is to be heated or cooled by the heat pump. Likewise, I will use the term "outdoor" to describe the general location of, or association with, the atmospheric space from which heat is extracted during the heat cycle, or to which heat is expelled during the cooling cycle, by the heat pump.

In the figures, which will be described below, items that are common to all of the prior art heat pumps as well as the heat pumps of the present invention will be numbered the same for the sake of facilitating understanding of the drawings. For example, the indoor thermal expansion valve (TEV) 116 can be essentially the same valve in all of the heat pumps, even though design criteria may dictate using a slightly different size or capacity of TEV in light of the additional enhancements provided by the present invention.

Figure 1B:
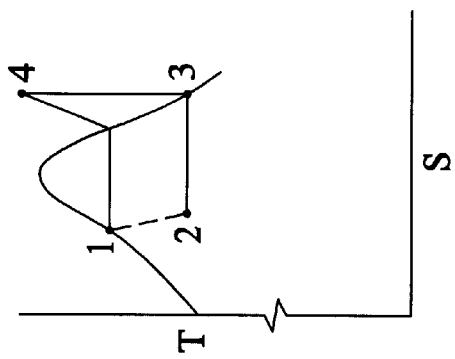
FIG. 1B is a chart showing the temperature/entropy thermal cycle of the prior art refrigeration system of FIG. 1A.
Figure 1C:
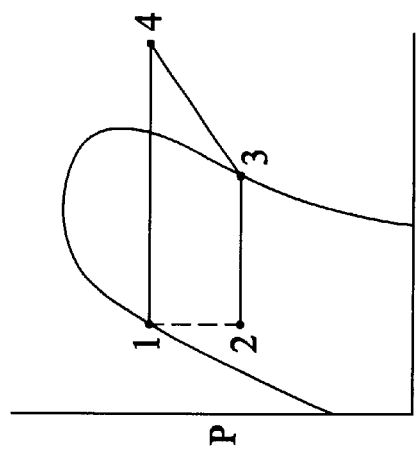
FIG. 1C is a chart showing the temperature/enthalpy thermal cycle of the refrigeration cycle of FIG. 1B.
Figure 1A:
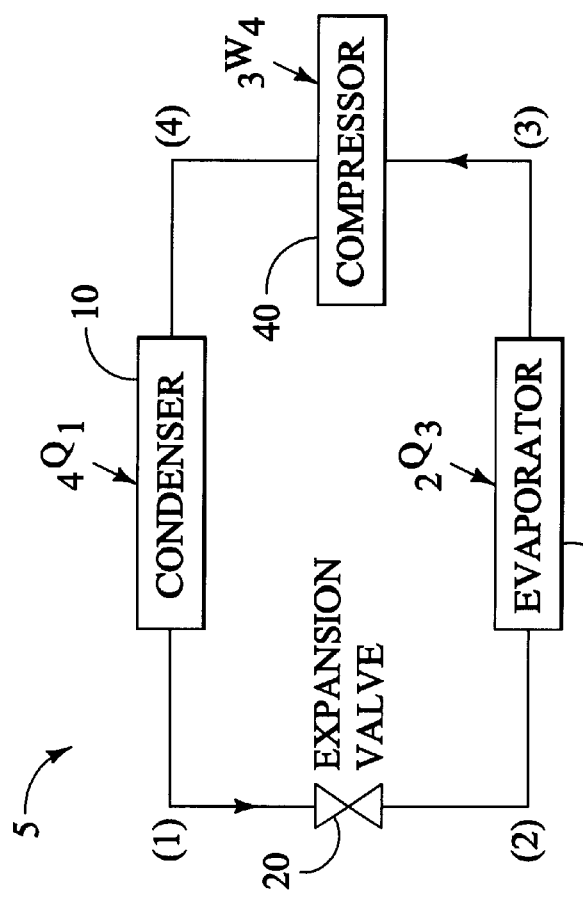
FIG. 1A is a schematic diagram of a prior art refrigeration process, corresponding to one cycle of a prior art heat pump.

With reference to FIG. 1B, which depicts the temperature T" and entropy "s" relationship during a prior art heat pump cycle, when the temperature at point 3 can be elevated (which corresponds to the saturated suction temperature ("SST") at the compressor 40 of FIG. 1A), then the temperature at point 4 will be elevated. In the heat mode, the temperature at point 4 corresponds to the temperature of the refrigerant as it enters the indoor heat exchanger (acting as a condenser, such as item 10 of FIG. 1A). Thus, if the temperature at point 4 can be raised, more thermal energy will be available to be extracted from the refrigerant to heat the environmental space "E". For example, for one prior art heat pump, I have determined that if the SST can be raised from 40° F. to 45° F., the heat which can be obtained from the condenser 10 raises from approximately 47,000 BTU/hour to approximately 51,500 BTU/hour. If the SST is increased to 55° F., then the heat which can be obtained from the condenser 10 raises to approximately 61,000 BTU/hour.

I have discovered that an attractive supplemental source of heat which can be used to elevate the SST (and therefore provide more heat to the environmental space) is a septic tank. Or more specifically, the fluid contained within a septic tank. Many residential homes and communities are provided with septic tanks. Three separate sources of energy are available via the septic tank. First, the temperature of any material deposited into the septic tank (be it solid or liquid) is typically at or above the outdoor atmospheric temperature during certain months of the year (typically, winter months, and more particularly so in certain geographical regions). Most residential septic systems receive not only solid waste but any waste water discharged from the residence or commercial building. Much of this waste water is so-called "grey water", which can include water from showering and bathing, water from laundry, and water from dish washing. Typically such waste water includes a large amount of warm or hot water, as in the case of bath water or dish washing water. A second source of energy available via a septic tank is the heat generated by biological decomposition of solid waste. Finally, a third source of heat available via a septic tank is ground heat which transfers from the ground in which the septic tank is located to liquid contained in the septic tank. Since most septic tanks are located six or more feet below the surface of the earth, and since in most habitable climates the earth rarely freezes below 18 inches from the surface, the septic tank is thus surrounded by earth which is at a relatively constant temperature year-around, which is typically above freezing (32 F.).

In certain situations, the septic tank can also provide a supplemental heat sink for a heat pump operating in the cooling mode. For example, in warm or hot climates, such as the southern United States, in the summer the temperature of fluid within a septic tank can be below the temperature of the atmospheric air. In this case the SST of the cooling cycle can be lowered, improving the operation of the heat pump. Turning again to FIG. 1A, in the cooling mode of the heat pump the outdoor heat exchanger becomes the condenser 10. If the temperature of refrigerant leaving the condenser at point 1 can be lowered, then more heat can be absorbed from the environmental space between points 3 and 4 (see also FIG. 1B). Preferably, valves and the like are provided so that the septic tank can be included or removed as a supplemental heat sink, or as a supplemental source of heat.

In addition to using a septic tank as a supplemental source of heat, a solar heat exchanger can also be provided to supply additional heat for the heat pump when the heat pump is operated in the heat mode. Preferably, valves and the like are provided so that the solar heat exchanger can be removed as a source of supplemental heat when the heat pump is operated in the cooling mode.

I have also discovered that a water preheat heat exchanger can also be used to lower the temperature of the refrigerant in a heat pump when the heat pump is used in the cooling mode. Most residential and commercial building are provided with a hot water tank which heats water for use by the residents, requiring the water to be heated from a low temperature to a high temperature using a hot water heater. I have discovered that heat extracted from the environmental space can be used to preheat this water before it enters the hot water heater. This not only reduces the energy needed to heat the water, but also helps to lower the SST of the refrigerant in the cooling mode.

I have further discovered a way to improve the defrost cycle of a heat pump so that less (or no) heat is extracted from the environmental space in order to defrost the coils of the outdoor heat exchanger.

Any or all of the above variations on my invention can be incorporated into a heat pump to provide a particularly efficient, effective heat pump. I will now describe these various embodiments of my invention in detail, with respect to the drawings. In the following discussion, components which are common to both prior art heat pumps, as well as to the heat pumps of the present invention, will not be redescribed (as for example, the accumulator 140, which operates in essentially the same manner for all heat pumps to provide essentially the same function).

Figure 3:
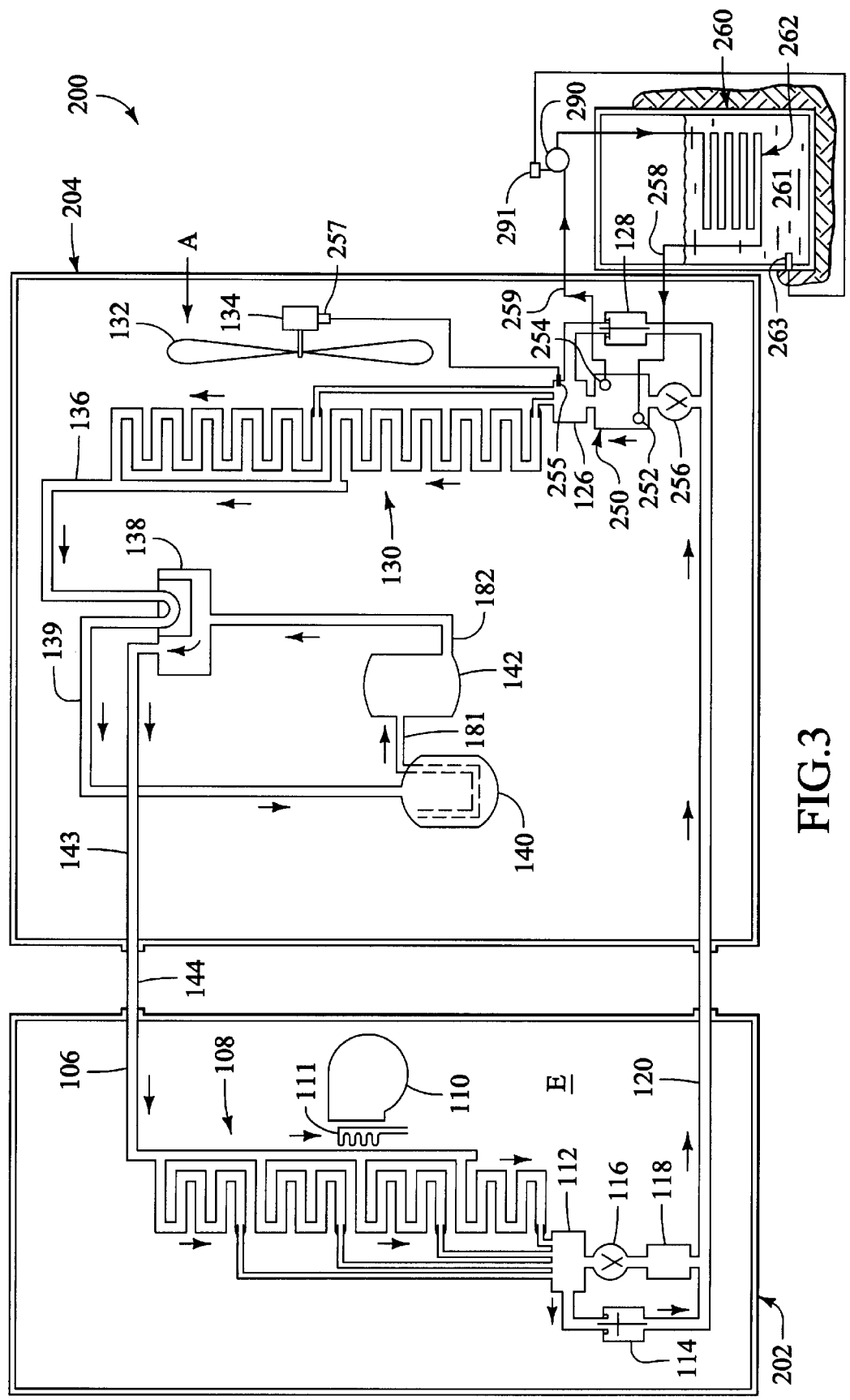
FIG. 3 is a schematic diagram of a heat pump in accordance with a first embodiment of the present invention, showing the heat pump in a heating mode.

Turning to FIG. 3, a heat pump 200, in accordance with a first embodiment of the present invention, is depicted in a schematic diagram. The heat pump 200 is shown operating in a heating mode (i.e., to heat the environmental space "E"). The general operation of a heat pump in a heating mode was described above with respect to FIG. 1, and need not be repeated here. The heat pump 200 includes those components which are like-numbered in the prior art heat pump 100 of FIG. 1, and which were described above in the section entitled, "Background of the Invention." The heat pump 200 includes an indoor unit 202, which provides for the transfer of heat to or from an indoor environmental space "E". The heat pump 200 also includes an outdoor unit 204, which provides for the respective transfer of heat from or to the atmosphere, as well as the of heat to or from a primary source of auxiliary heat (or a primary source of auxiliary cooling), which is provided here as the fluid 261 in the septic tank 260.

The heat pump 200 includes a compressor 142 having a compressor inlet 181 and a compressor outlet 182. The heat pump 200 has an indoor heat exchanger 108 which operates as a condenser in the heat mode of the heat pump, and as an evaporator in the cooling mode. The heat pump 200 further includes an outdoor heat exchanger 130 which operates as an evaporator in the heat mode of the heat pump, and as a condenser in the cooling mode. The heat pump 200 further includes an outdoor thermal expansion valve ("TEV") 256, an auxiliary heat exchanger 250, and an auxiliary fluid pump 290. The heat pump 200 also has an auxiliary fluid line, which is defined by an outlet portion 259 which is connected at a first end to an outlet 254 to the auxiliary heat exchanger 250, and is connected at a second end to suction of the auxiliary fluid pump 290. The auxiliary fluid line further includes a heat transfer portion 262, which, as depicted here, comprises a series of coils placed at least partially in the fluid 261 in the septic tank 260, and which are in fluid communication with the discharge of the auxiliary fluid pump 290. Finally, the auxiliary fluid line includes a third portion 258, which is connected at a first end to the heat transfer portion 262, and at a second end to an inlet 252 to the auxiliary heat exchanger 250. In this way, an auxiliary fluid can be circulated through the coils 262 in the septic tank 260 so that heat can be transferred from a primary source of auxiliary heat (such as the fluid 261 in the septic tank 260) to the auxiliary fluid. The heat from the auxiliary fluid can then be transferred to the refrigerant via the auxiliary heat exchanger 250.

Preferably, the auxiliary fluid is a fluid which will not freeze at the maximum anticipated outdoor atmospheric temperature. Examples of suitable auxiliary fluids include propylene glycol and ethylene glycol. Further, preferably the coil portion 262 of the auxiliary fluid line is fabricated from a material which will not deteriorate in a septic tank environment, and which allows transfer of heat from the fluid 261 in the septic tank 260 to the auxiliary fluid in the auxiliary fluid line 262. One example of a suitable material for the coil portion 262 of the auxiliary fluid line is polyvinyl chloride ("PVC") tubing.

Preferably, the auxiliary heat exchanger 250 is designed to impart a low pressure drop to the refrigerant as the refrigerant passes through the auxiliary heat exchanger. One example of such a heat exchanger is a plate-and-frame heat exchanger. Another example of such a heat exchanger is a tube-and-tube, or a tube-and-shell, heat exchanger (where the refrigerant is preferably passed on the shell side of the exchanger, and the auxiliary fluid is preferably passed on the tube side).

The compressor outlet 182, the indoor heat exchanger 108, the outdoor thermal expansion valve 256, the auxiliary heat exchanger 250, the outdoor heat exchanger 130, and the compressor inlet 181 can be placed in respective serial fluid communication with one another (as depicted in FIG. 3) to thereby define a closed loop through which a refrigerant fluid can be circulated. I say that these components "can" be placed in respective serial fluid communication, and not that they "are" placed in serial fluid communication, since typically a heat pump includes a reversing valve 138 which can be operated to place the primary components in a second, different serial relationship, as will be described further below. (When the components are placed in the second serial relationship, the heat pump basically operates in the cooling mode, similar to the depiction in FIG. 2, versus the heating mode depicted in FIG. 3.)

As mentioned, the auxiliary fluid pump 290 is configured to circulate an auxiliary heat transfer fluid through the auxiliary fluid line 259, 262, 258. The auxiliary heat exchanger 250 is configured to exchange heat between the refrigerant fluid and the auxiliary heat transfer fluid, and the auxiliary thermal transfer fluid in the auxiliary fluid line is in thermal energy communication with a primary source of auxiliary heat (such as the fluid 261 in the septic tank 260). In one variation, the coil portion 262 of the auxiliary fluid line can be placed in the earth ("EARTH"). In this way, the earth can act as the primary source of auxiliary heat used to heat the refrigerant in the auxiliary heat exchanger 250.

The outdoor unit 204 of the heat pump 200 can also include a fan 132 configured to force atmospheric air "A" past the outdoor heat exchanger 130 to thereby facilitate heat transfer to the atmospheric air from the refrigerant passing through the outdoor heat exchanger. The fan 132 is driven by a motor 134. When sufficient heat is acquired from the source of auxiliary heat (e.g., the septic tank 260), then the fan 132 may not be needed to facilitate heat transfer from the atmosphere "A" in the outdoor exchanger 130. Accordingly, the motor 134 can be shut down, thus saving more energy. In order to accomplish this, the heat pump 200 can include a refrigerant thermal sensor 255 (depicted as inserted in distributor 126) configured to detect the temperature of the refrigerant passing from the auxiliary heat exchanger 250 to the outdoor heat exchanger 130, and to generate a temperature signal in response. A fan motor thermal switch 257 is provided to receive the temperature signal and to stop the motor when the signal indicates that the temperature of the refrigerant passing from the auxiliary heat exchanger 250 to the outdoor heat exchanger is above a predetermined level.

On the other hand, if too much heat is removed from the septic tank by the auxiliary heat exchanger 250, then at a certain point biodegradation of waste in the septic tank may cease, and in fact the fluid 261 in the septic tank 260 can freeze, both of which have obvious undesirable consequences. In order to guard against this occurring, the heat pump 200 can include a septic tank thermal sensor 263 (which is depicted as being placed in the fluid 261 of the septic tank 260). The septic tank thermal sensor 263 is configured to detect the temperature of the fluid 261 within the septic tank 260 and to generate a temperature signal in response thereto. The heat pump 200 further includes an auxiliary fluid pump thermal switch 291 configured to receive the temperature signal from the sensor 263 and to stop the auxiliary fluid pump 290 when the signal indicates that the temperature of the fluid within the septic tank 260 is below a predetermined level. For example, if the temperature in the septic tank drops below 34° F., then the auxiliary fluid circulation pump 290 can be shut down to prevent damage to the septic tank or the biological operation of the septic system.

As mentioned previously, the heat pump 200 can (and typically does) include a reversing valve 138, allowing the direction of flow of the refrigerant in the heat pump to be reversed so that the heat pump can alternately and selectively operate in a heating mode or a cooling mode. When a reversing valve 138 is provided, the heat pump 200 includes an indoor thermal expansion valve 116, an indoor check valve 114 in parallel fluid arrangement with the indoor thermal expansion valve 116, and an outdoor check valve 128 in parallel fluid arrangement with the outdoor thermal expansion valve 256. The reversing valve 138 is disposed in the heat pump 200 such that it is in fluid communication with the compressor outlet 182. The reversing valve 138 is selectable between two positions. In a first position, corresponding to the heating mode of the heat pump 200, the reversing valve 138 directs the compressor outlet 182 (or, more specifically, the refrigerant from the compressor outlet) to the indoor heat exchanger 108 (via fluid transfer lines 143 and 106). In this way the compressor outlet 182, the indoor heat exchanger 108, the indoor check valve 114, the outdoor thermal expansion valve 256, the auxiliary heat exchanger 250, the outdoor heat exchanger 108, and the compressor inlet 181 are all placed in respective serial fluid communication with one another. In a second position, corresponding to the cooling mode of the heat pump 200, the reversing valve 138 directs the compressor outlet 182 (or, more specifically, the refrigerant from the compressor outlet) to the outdoor heat exchanger 130 to thereby put the compressor outlet 182, the outdoor heat exchanger 130, the auxiliary heat exchanger 250, the outdoor check valve 128, the indoor thermal expansion valve 118, the indoor heat exchanger 108, and the compressor inlet in respective serial fluid communication with one another. I will make reference to these two positions of the reversing valve 138 in further discussion below.

Figure 4:
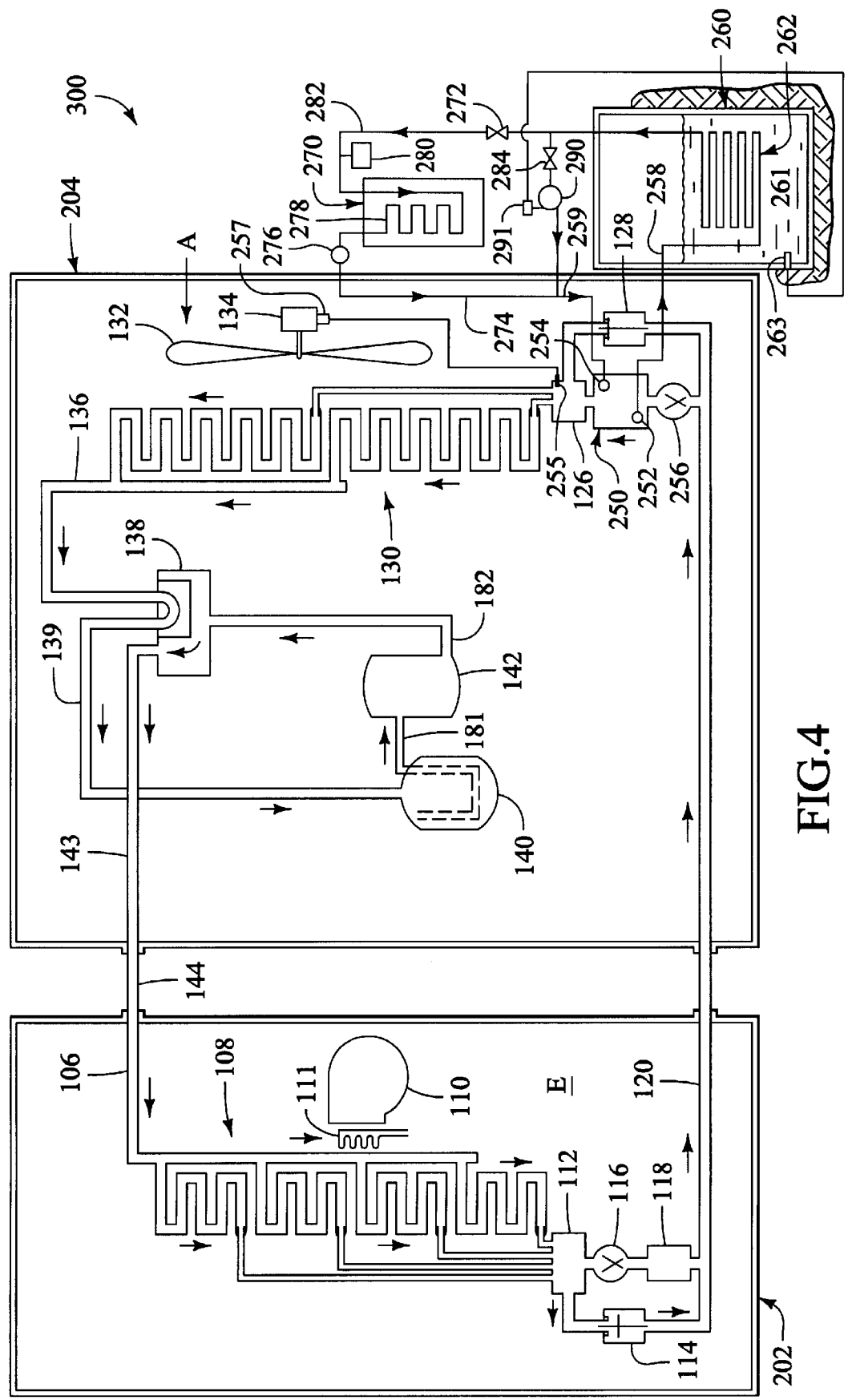
FIG. 4 is a schematic diagram of the heat pump depicted in FIG. 3, but with a second auxiliary heat source.

In another variation, the heat pump 200 can further include a secondary source of auxiliary heat to supplement the primary source of auxiliary heat (such as the fluid 261 in the septic tank 260). FIG. 4 depicts a heat pump 300 which includes a solar heat exchanger 270 which acts to obtain solar energy to act as a secondary source of auxiliary heat. With the exception of the solar heat exchanger 270 and equipment collateral thereto (e.g., valves, pipes, etc.), the heat pump 300 of FIG. 4 is in most other respects the same as the heat pump 200 of FIG. 3, except that preferably the direction of flow of the auxiliary fluid through the auxiliary fluid line and the auxiliary heat exchanger 250 is reversed. The solar heat exchanger 270 is connected to the coil portion 262 of the auxiliary fluid line using a "T" connection and a solar heating inlet line 282. The solar heating inlet line 282 is in fluid communication with a solar heating coil 278 in the solar exchanger 270. The solar heating coil 278 is further in fluid communication with a solar heating outlet line 274, which connects by a "T" connection to the first portion 259 of the auxiliary fluid line. In this way, the auxiliary fluid can be circulated first through the septic tank 260, and then through the solar heat exchanger 270. (Circulating the auxiliary fluid in the opposite direction would result in heating the fluid in the septic tank, which would not contribute to improved operation of the heat pump 300).

The solar heat exchanger 270 is configured to transfer solar energy to the auxiliary fluid. In almost all instances, the solar heat exchanger will serve to elevate the temperature of the auxiliary fluid, rather than lower it. Accordingly, it is desirable to provide equipment to allow the solar heat exchanger to supplement heat added to the auxiliary fluid during the heat mode of the heat pump, but to effective isolate the solar heat exchanger from the auxiliary fluid line when the heat pump is in the cooling mode. Accordingly, the heat pump 300 can be provided with a solar energy isolation valve 272 which can isolate the solar heating inlet line extension 282 of the auxiliary fluid line from the solar energy (i.e., from the solar exchanger 270). Valve 272 thus is normally closed when the heat pump 300 is operating in the cooling mode. A primary auxiliary source isolation valve 284 can also be provided in the section of the auxiliary fluid line which is disposed between the solar heating inlet line 282 and the solar heating outlet line 274. This valve 284 can be closed when the solar energy isolation valve 272 is open and the heat pump 300 is in the heat mode to prevent the auxiliary fluid from bypassing the solar exchanger 270. When the heat pump 300 is in the cooling mode and heat is being expelled from the auxiliary line coil 262 to the fluid 261 in the septic tank 260, valve 284 is open. It can also be desirable to provide a supplemental auxiliary fluid circulation pump 276.

Figure 5:
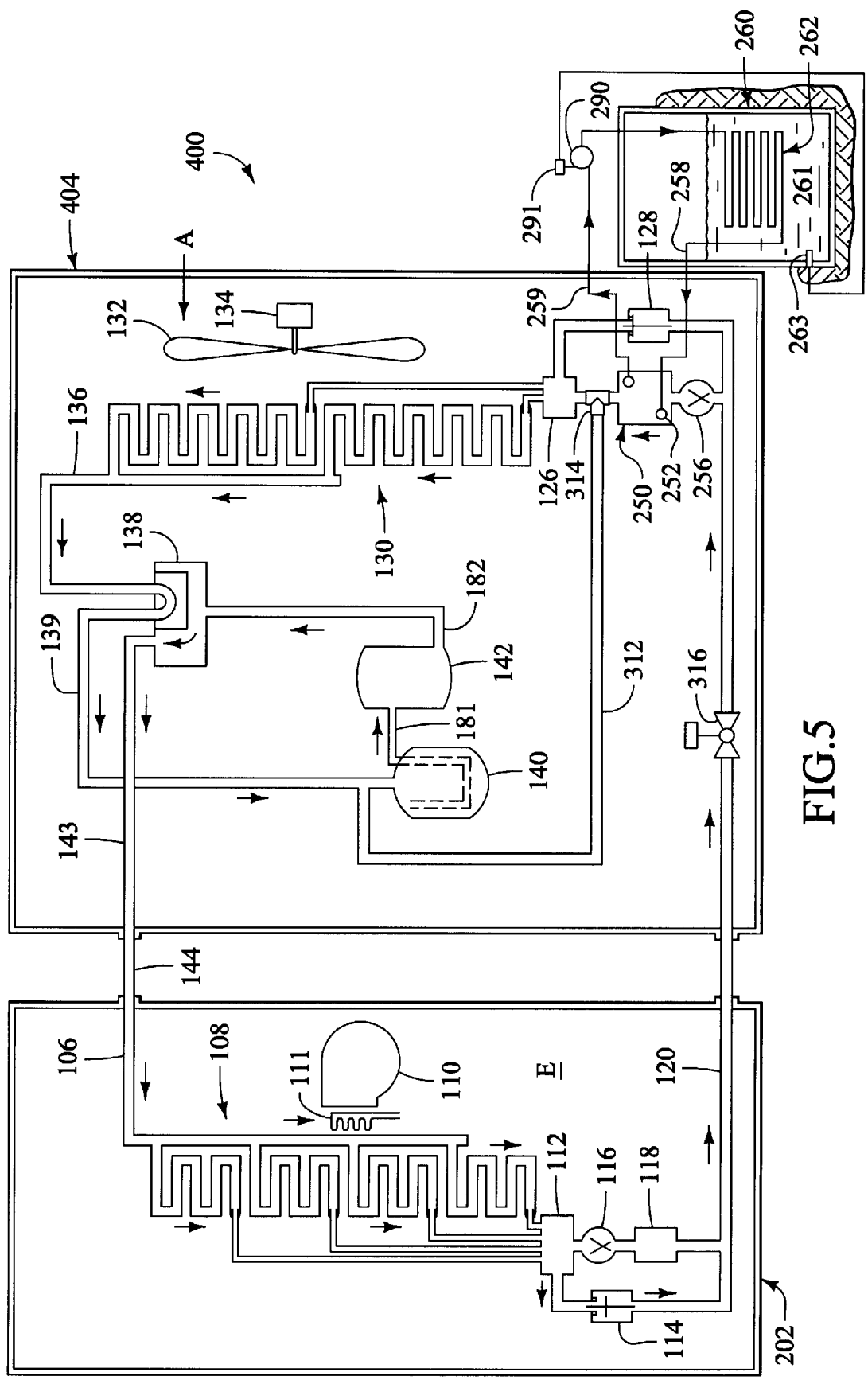
FIG. 5 is a schematic diagram of the heat pump of FIG. 3 but with an auxiliary system for defrosting the outdoor exchanger, and depicted in a cooling mode.

In another variation of the present invention a modified defrost system is provided to a heat pump so that the heat pump extracts little, if any, energy from the environmental space "E" in order to defrost the coils of the outdoor heat exchanger 130. Turning to FIG. 5, a heat pump 400 having a modified defrost system is depicted in schematic diagram. With the exception of the additional defrost equipment which will be described immediately below, the heat pump 400 of FIG. 5 is in all other respects similar to the heat pump 200 of FIG. 3. The heat pump 400 of FIG. 5 is depicted as operating in a normal heating mode, using the heat from the fluid 261 in the septic tank 260 to augment the heat obtained from the atmosphere "A". The same heat pump 400 is depicted in FIG. 6, operating in a defrost mode.

The heat pump 400 includes an indoor unit 202 and an outdoor unit 404. The outdoor unit 404 includes a three-way defrost valve 314 disposed between the outdoor heat exchanger 130 and the auxiliary heat exchanger 250. The outdoor unit 404 further includes a defrost line 312 in fluid communication with the compressor inlet 181, and a defrost isolation valve 316 disposed in the refrigerant line 120 between the indoor check valve 114 and the outdoor thermal expansion valve 256. The three-way defrost valve 314 is selectable to a first position (as depicted in FIG. 5) to place the auxiliary heat exchanger 250 and the outdoor heat exchanger 130 in fluid communication, which is the position the valve is in during normal operation of the heat pump (heating mode or normal cooling mode). The three-way defrost valve 314 is further selectable to a second position to place the auxiliary heat exchanger 250 and the defrost line 312 in fluid communication. When the heat pump 400 is in normal operating mode (heating or cooling), then the defrost isolation valve 316 is open.

Figure 6:
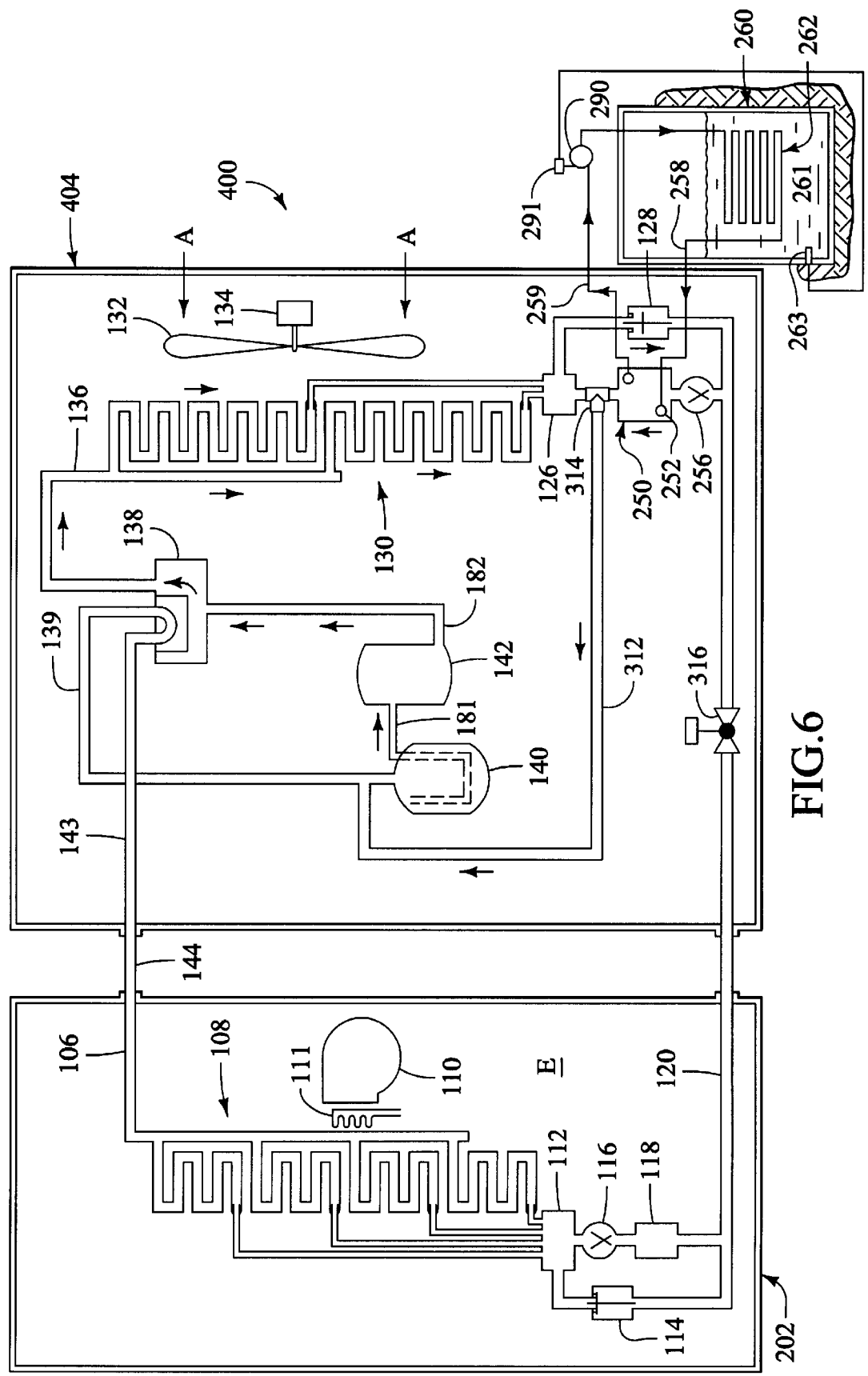
FIG. 6 is a schematic diagram of the heat pump of FIG. 5 in a defrost mode.

The defrost mode of the heat pump 400 is depicted in FIG. 6. As can be seen, the defrost isolation valve 316 is closed so that no refrigerant circulates through the indoor heat exchanger 108. This prevents the defrost cycle from extracting heat from the environmental space "E". In the defrost mode of FIG. 6, the three-way defrost valve 314 allows refrigerant from the auxiliary heat exchanger 250 (which has been heated by the septic tank 260) to circulate back to the compressor inlet 181, so that the refrigerant is then discharged to the outdoor heat exchanger 130. The warmed refrigerant can then defrost the coils of the outdoor heat exchanger 130. (Note that the reversing valve 138 is in the "second", or cooling mode position in FIG. 6, whereas in FIG. 5 the reversing valve 138 is in the first, or heating position.)

Figure 7:
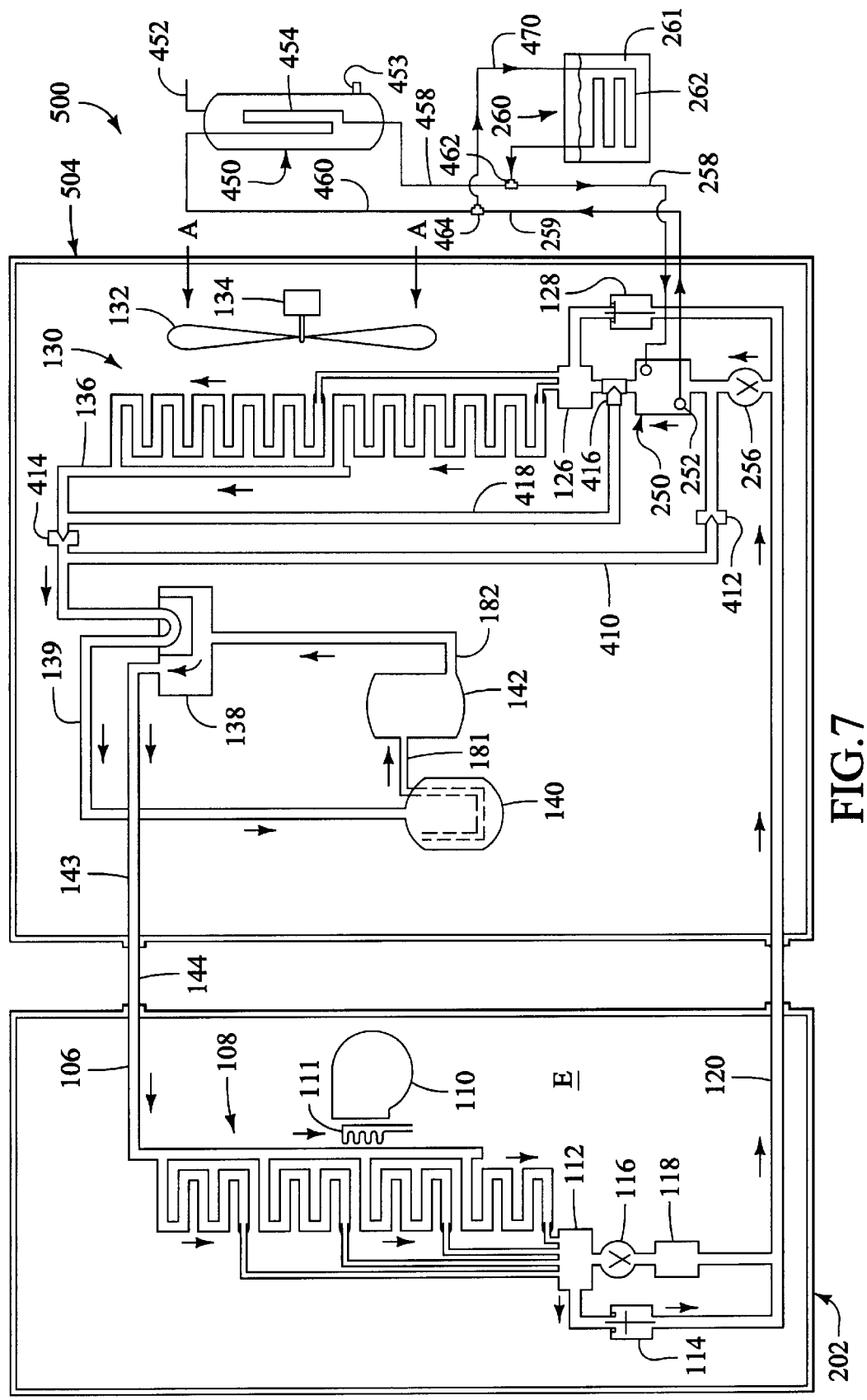
FIG. 7 is a schematic diagram of FIG. 3 but with an auxiliary system for preheating water.
Figure 8:
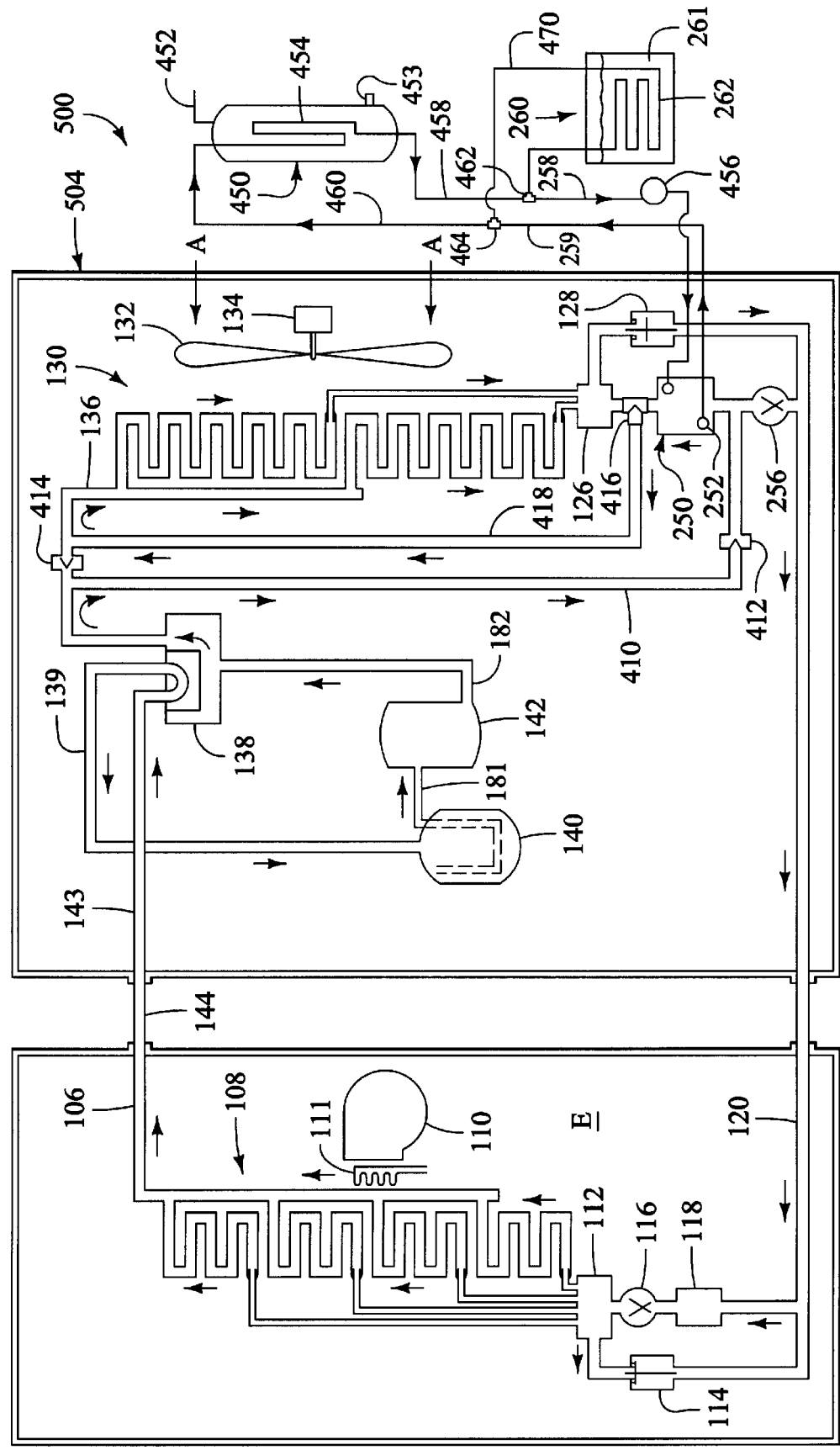
FIG. 8 is a schematic diagram of the heat pump of FIG. 7 showing the heat pump in the cooling mode.

Turning now to FIG. 7, another variation on the present invention is depicted. In this variation a water preheat system is used to extract heat from the refrigerant when the heat pump is operating in the cooling mode. The water preheat system can also be considered as a "refrigerant pre-cooling" system. FIG. 7 depicts the heat pump 500 operating in the heating mode, and FIG. 8 depicts the heat pump 500 operating in the cooling mode (during which water preheating can occur). As described above, this application can be useful to preheat water in a residential or commercial situation when the water will ultimately be heated to a high temperature with a separate water heater. This application is particularly attractive where the source of water provides for relatively cold water, as for example when the water is provided from a well or an underground source. With the exception of the additional water preheat equipment which will be described immediately below, the heat pump 500 of FIG. 7 is in all other respects similar to the heat pump 200 of FIG. 3. The heat pump 500 of FIG. 7 is depicted as operating in a normal heating mode, using the heat from the fluid 261 in the septic tank 260 to augment the heat obtained from the atmosphere "A". I will first describe the various components of the water preheat system of the heat pump 500. I will then provide a description of the operation of the water preheat system.

The heat pump 500 includes a water preheat heat exchanger 450 configured to transfer heat between the auxiliary heat transfer fluid and water which is to be heated. The water preheat heat exchanger 450 has a preheat exchanger inlet 460 and a preheat exchanger outlet 458 for the auxiliary heat transfer fluid. The water to be preheated is received in the preheat exchanger at inlet 452, and is discharged at outlet 453. A coil 454 within the water preheat exchanger 450 facilitates heat transfer from the auxiliary fluid to the water. In this way, the auxiliary fluid is cooled, allow it to further cool the refrigerant in the auxiliary heat exchanger 250, thus providing a cooler refrigerant to the indoor exchanger 108. This in turn allows the heat pump 500 to extract more heat from the environmental space "E" when the heat pump is operating in the cooling mode.

The heat pump 500 further includes a three-way water preheat inlet valve 464 disposed in the first portion 259 of the auxiliary fluid line. The three-way water preheat inlet valve 464 is selectable to a first position to direct the auxiliary heat transfer fluid from the auxiliary heat exchanger 250 to the preheat exchanger inlet 460. The three-way water preheat inlet valve 464 is further selectable to a second position to direct the auxiliary heat transfer fluid from the auxiliary heat exchanger 250 to the primary source of auxiliary heat (here, the coils 262 in the septic tank) using a preheat bypass line 470. In this way, when the heat pump 500 is operating in the heating mode, the auxiliary fluid can be isolated from the preheat exchanger 450 to prevent cooling of the auxiliary fluid by the preheat exchanger.

The heat pump can further include a three-way water preheat outlet valve 462 disposed in the auxiliary fluid line 258 and selectable to a first position to direct the auxiliary heat transfer fluid from the preheat exchanger outlet 458 to the auxiliary heat exchanger 250. The three-way water preheat outlet valve 462 is further selectable to a second position to direct the auxiliary heat transfer fluid from the primary source of auxiliary heat (the coil 262 in the septic tank 260) to the auxiliary heat exchanger 250. In this way, the water preheat exchanger 450 can be completely isolated from the auxiliary fluid. This can be desirable in the event fluid from the septic tank 260 somehow should enter the auxiliary fluid line 262. Other techniques to guard against any fluid 261 from the septic tank 260 passing into the water in the preheat exchanger 450 is to operate the pressure of the auxiliary fluid at a pressure above the highest anticipated pressure in the septic tank (maximum static head, typically), but at a pressure lower than the lowest anticipated pressure of water entering the preheat exchanger 450. In this way, a leak in the auxiliary fluid line 262 will result in the auxiliary fluid entering the septic tank 260. Likewise, a leak in the coil 454 will result in water entering the auxiliary fluid line. Neither situation will allow fluid 261 from the septic tank to enter water being preheated by the preheat exchanger 450. Another technique to guard against this problem is to fabricate the preheat exchanger as a tank containing the water, and having wraps of coils containing the auxiliary fluid wrapped around the outside of the tank.

The heat pump 500 can further include a water preheat bypass loop 410, 418, and a three-way water preheat valve 416. When the reversing valve 138 is in the second position (as depicted in FIG. 8, being the cooling mode), the preheat bypass loop directs the refrigerant from the compressors 142 to the auxiliary heat exchanger 250, and thence from the auxiliary heat exchanger to the outdoor heat exchanger 130 via the three-way preheat valve 416. However, when the reversing valve 138 is in the first position (as depicted in FIG. 7, being the heating mode), refrigerant from the outdoor thermal expansion valve 256 passes through the auxiliary heat exchanger 250 and into the outdoor heat exchanger via the three-way preheat valve 416.

Finally, the heat exchanger can include a water preheat first check valve 414, and a water preheat second check valve 412. The water preheat first check valve 414 is disposed between the reversing valve 138 and the outdoor heat exchanger 130 to prevent refrigerant from passing directly from the compressor outlet 182 to the outdoor heat exchanger 130 when the reversing valve is in the second position (the cooling position). That is, the first check valve 414 ensures that in the cooling mode the refrigerant first passes through the auxiliary exchanger 250 so that water can be preheated (and the refrigerant cooled) before the refrigerant is passed to the outdoor heat exchanger 130 (acting as a condenser in this mode). The water preheat second check valve 412 is disposed in leg 410 of the preheat loop between the reversing valve 138 and the auxiliary heat exchanger 250 to prevent refrigerant from passing from the outdoor thermal expansion valve 256 to the preheat loop 410, 418 when the reversing valve is in the first position (the heating position).

I will now provide a description of how the heat pump 500 of FIGS. 7 and 8 can be operated. With respect to FIG. 7, the heat pump 500 is operating in the heating mode. Accordingly, water preheating is not performed in this mode, since the objective is to add heat to the refrigerant (for transfer to the environmental space "E"), rather than to remove more heat from the refrigerant. Accordingly, the primary source of auxiliary heat (being the fluid 261 in the septic tank 260) is made available to the auxiliary fluid in the auxiliary fluid line 262 to thereby heat the auxiliary fluid. The heat from the auxiliary fluid is then transferred to the refrigerant in the auxiliary exchanger 250. More specifically, the auxiliary fluid is circulated through auxiliary fluid lines 259, 470, coils 262, line 258, and the auxiliary heat exchanger 250. Valves 464 and 462 in the auxiliary line are closed to lines 460 and 458 to prevent the auxiliary fluid from entering the water preheat exchanger 450, where the auxiliary fluid would be cooled (rather than heated). The three-way preheat valve 416 directs the warmed refrigerant from the auxiliary heat exchanger 250 to the outdoor exchanger 130, where additional heat can be added to the refrigerant. Check valve 412 is held in a closed position as a result of the difference in pressure between the refrigerant exiting the outdoor thermal expansion valve 256, and refrigerant exiting the outdoor exchanger 130. This helps to keep the refrigerant from passing back to the auxiliary heat exchanger 250.

When the heat pump 500 is in the cooling mode, as depicted in FIG. 8, then water preheating (or "refrigerant pre-cooling") is performed, since the objective is to remove heat from the refrigerant (so that additional heat can be removed from the environmental space "E"). Accordingly, heat is not added to the refrigerant using the septic tank 260 during the cooling mode. (However, if the septic tank is at a temperature lower than the ambient temperature and/or the water temperature, then the septic tank could be used for additional cooling.) Assuming the septic tank 260 is not used as an auxiliary heat sink to cool the auxiliary fluid, the auxiliary fluid can be cooled using the water preheat exchanger 450, and the auxiliary fluid can then be then used to cool the refrigerant via the auxiliary exchanger 250. More specifically, the auxiliary fluid is circulated through auxiliary fluid lines 259, 460, coils 454, lines 458 and 258, and the auxiliary heat exchanger 250. Valves 464 and 462 in the auxiliary line are closed to the coil 262 in the septic tank 260 to prevent the auxiliary fluid from entering the septic tank coil 262, where the auxiliary fluid would typically (but not necessarily) be heated (rather than cooled). The check valve 414 serves to direct the refrigerant from the compressor 142 into the bypass line 410, and from there into the auxiliary heat exchanger 250. As mentioned, the auxiliary fluid, now cooled by the water preheat exchanger 450, cools the refrigerant. The refrigerant then exits the auxiliary heat exchanger 250 and is directed by the three-way preheat valve 416 back to the inlet of the outdoor heat exchanger 130, where further cooling (and condensing) of the refrigerant can occur.

Figure 9:
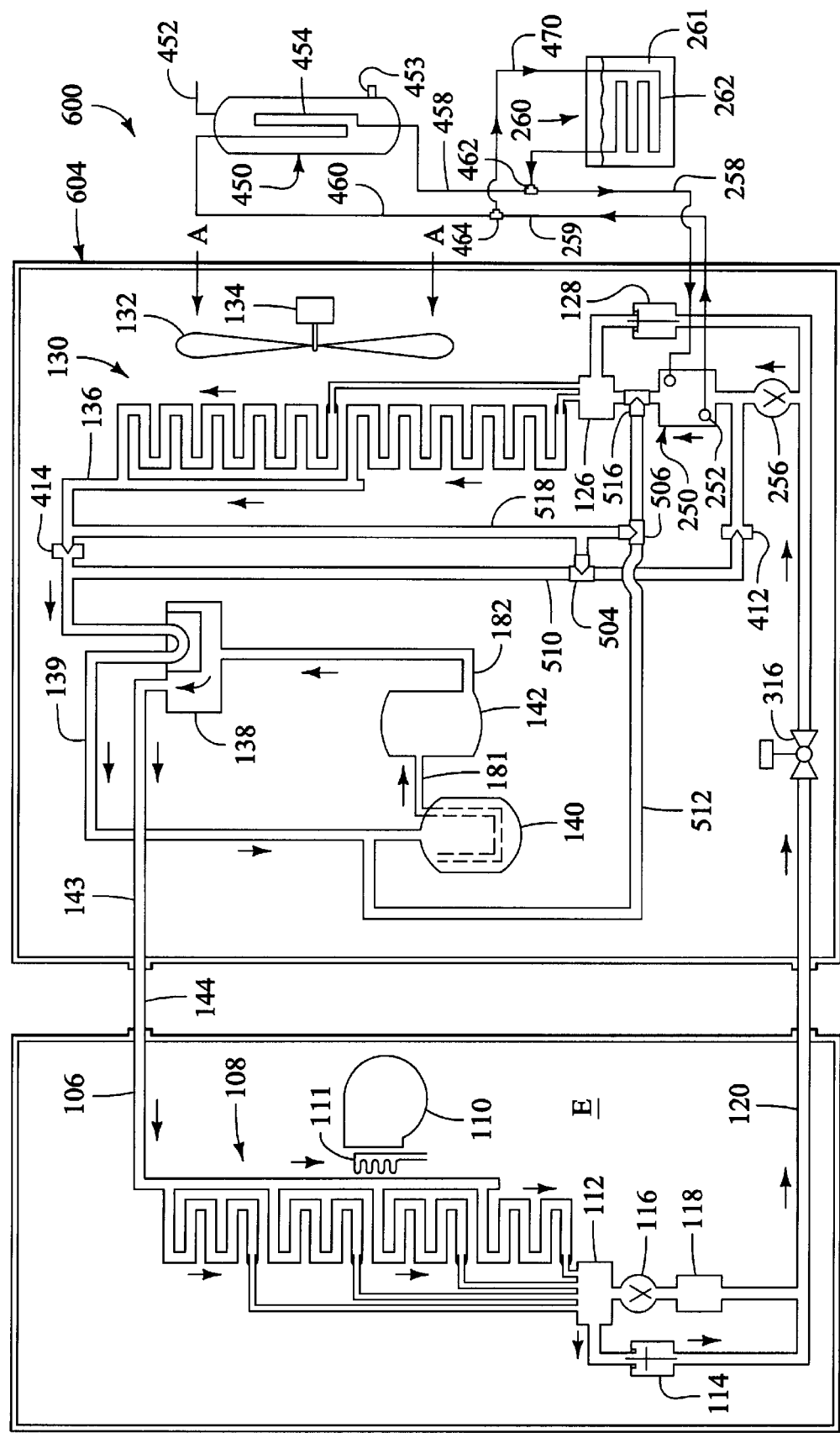
FIG. 9 is a schematic diagram of a heat pump which incorporates the auxiliary system for defrosting the outdoor exchanger depicted in FIG. 5, as well as the auxiliary system for preheating water of FIG. 7.

Turning now to FIG. 9, a further variation of the present invention is depicted. In FIG. 9, a schematic diagram of a heat pump 600 is shown. The heat pump 600 is depicted as operating in the heating mode, wherein heat is being transferred to the indoor environment "E". The heat pump 600 includes an indoor unit 202, which is essentially the same as the indoor unit 202 of FIG. 3, as well as an outdoor unit 604, which is modified from the other outdoor unit of the other variations discussed above. The heat pump 600 of FIG. 9 essentially includes the water preheat system of FIGS. 7 and 8, as well as the modified defrost system of FIGS. 5 and 6. The heat pump 600 thus essentially includes all of the components described above with respect to FIGS. 5–8 except as described below and as shown in the drawings. The heat pump 600 further includes additional components, which will now be described. Following the description of the additional components of the heat pump 600, 1 will describe the method of operation of the heat pump 600.

The heat pump includes a first three-way defrost valve 506, a second three-way defrost valve 504, and a defrost line 512 capable of being placed in fluid communication with the compressor inlet 181 and the three-way water preheat valve 516, to allow the heat pump 600 to operate in a defrost mode. The first three-way defrost valve 506 is disposed in the defrost line 512 between the three-way water preheat valve 516 (which is similar to the three-way water preheat valve 416 of FIG. 7) and the inlet to the compressor 181. The second three-way defrost valve 504 is disposed in the preheat loop 510, 518 (which is similar to the preheat loop 410, 418 of FIG. 7) between the reversing valve 138 and the outdoor thermal expansion valve 256. (Note: in the heat pump 400 of FIG. 5, there is only one defrost three-way valve 314, which is located between the auxiliary heat exchanger 250 and the outdoor heat exchanger 130. In the heat pump 600 of FIG. 9 this position is occupied by the three-way water preheat valve 516.)

When the reversing valve 138 is in the first position (the position depicted in FIG. 9, corresponding to the heating mode), refrigerant from the outdoor thermal expansion valve 256 passes through the auxiliary heat exchanger 250 and into the outdoor heat exchanger 130 via the three-way preheat valve 516. In this heating mode, the fluid 261 in the septic tank 260 is used to heat the auxiliary fluid and thus the refrigerant, in the manner described above with respect to FIG. 7. When the reversing valve 138 is in the second position (i.e., the position depicted in FIG. 8, corresponding to the cooling mode), then the preheat bypass loop 510, 518 directs the refrigerant from the compressor 142 through the second three-way defrost valve 504 to the auxiliary heat exchanger 250, and thence from the auxiliary heat exchanger 250 to the outdoor heat exchanger 130 via the three-way preheat valve 516 and the first three-way defrost valve 506. In this cooling mode, the water in the water preheat heat exchanger 450 is used to cool the auxiliary fluid, and thus the refrigerant, in the manner described above with respect to FIG. 8. When the heat pump 600 is in the defrost mode, the reversing valve 138 is in the second position, and refrigerant from the outlet 182 of the compressor 142 is directed through the second three-way defrost valve 504 to the outdoor heat exchanger 130, thence through the outdoor check valve 128 to the outdoor thermal expansion valve 256, thence to the auxiliary heat exchanger 250, and thence by the three-way preheat valve 516 and the first three-way defrost valve 506 to the inlet 181 of the compressor 142. In this defrost mode, the fluid 261 in the septic tank 260 is used to heat the auxiliary fluid and thus the refrigerant, in the manner described above with respect to FIG. 6.

The heat pump 600 can further include a defrost isolation valve 316, which operates in the manner described above with respect to FIG. 6. That is, the defrost isolation valve 316 disposed between the outdoor check valve 128 and the indoor thermal expansion valve 116 to obstruct the flow of refrigerant to the indoor thermal expansion valve 116 when the heat pump 600 is in the defrost mode. However, the defrost isolation valve 316 allows the flow of refrigerant to the indoor thermal expansion valve 116 when the heat pump 600 is not in the defrost mode. Note that the addition of the second three-way defrost valve 504 obviates the water preheat second check valve 412 of FIG. 7.

The heat pump 600 operates as follows. In the heating mode (depicted in FIG. 9), cooled, condensed refrigerant from the indoor heat exchanger 108 passes from the indoor check valve 114 through the open defrost isolation valve 316 and through the outdoor thermal expansion valve 256. (In this case, the outdoor check valve 128 does not allow the refrigerant to flow to the outdoor exchanger 130). The refrigerant passes through the auxiliary heat exchanger 250 and picks up heat from the auxiliary fluid. In this mode, the valves 464 and 462 direct the auxiliary fluid to the coil 262 in the septic tank 260 so that the auxiliary fluid picks up heat from the fluid 261; the valves 464 and 462 prevent the auxiliary fluid from being cooled by the water preheat exchanger 450. The three-way preheat valve 516 directs the refrigerant to the outdoor exchanger 130 (acting as an evaporator in this mode). The refrigerant passes through the outdoor exchanger and absorbs additional heat from the atmosphere "A". The refrigerant then passes through the reversing valve 138 (which is in the first position, as shown), the compressor 142, and back to the indoor exchanger 108, where heat is extracted from the refrigerant to heat the indoor environmental space "E".

In the cooling mode (not specifically shown, but similar to FIG. 8), the refrigerant within the heat pump 600 passes out of the compressor 142, and the reversing valve 138 (now in the second position, as depicted in FIG. 8) and the check valve 414 cause the refrigerant to flow into the water preheat bypass line 510. The refrigerant is directed by the second three-way defrost valve 504 to the inlet to the auxiliary heat exchanger 250, and then from the auxiliary changer, via the three-way preheat valve 516, to the preheat line 518. In this mode, the valves 464 and 462 direct the auxiliary fluid to the coil 454 in the water preheat heat exchanger 450 so that heat is removed from the auxiliary fluid by the water that is being preheated; the valves 464 and 462 can prevent the auxiliary fluid from being heated by the fluid 261 in the septic tank 260, which would have the ultimate effect of heating the refrigerant, which is opposite of the desired effect to be achieved. The first three-way defrost valve 506 then directs the refrigerant to the upper end of the outdoor exchanger 130. The refrigerant passes through the outdoor exchanger 130 (which acts as a condenser in this mode to remove additional heat from the refrigerant), and from there the refrigerant passes through the outdoor check valve 128 and to the indoor thermal expansion valve 116. (The preheat isolation valve 316 is open in this mode. Also, the three-way preheat valve 516 prevents the refrigerant from entering the auxiliary heat exchanger 250 in this mode.) The refrigerant then passes through the indoor thermal expansion valve 116, and then through the indoor exchanger 108 (acting as an evaporator in this mode) where the refrigerant removes heat from the indoor environmental space "E". The refrigerant then passes back to the suction 181 of the compressor 142 via the reversing valve 138.

In the defrost mode (not specifically depicted, but similar to FIG. 6), the refrigerant within the heat pump 600 passes out of the compressor 142. The reversing valve 138 (now in the second position, as depicted in FIG. 6) and the check valve 414 cause the refrigerant to flow into the water preheat bypass line 510. In the defrost mode, the second three-way defrost valve 504 directs the refrigerant into the bypass line 518, and then into the outdoor heat exchanger 130 (since the first three-way defrost valve 506 does not allow refrigerant to pass directly from the bypass line 518 into the defrost line 312). As the refrigerant vapor passes through the outdoor exchanger 130, heat is extracted from the refrigerant, condensing the refrigerant and defrosting the coils of the outdoor exchanger 130. The liquid refrigerant exits from the outdoor exchanger 130 and passes, via the outdoor check valve 128, into the outdoor thermal expansion valve 256. The defrost isolation valve 316 is closed, preventing the refrigerant from passing to the indoor unit 202. The refrigerant thus passes into the outdoor thermal expansion valve 256 where it flashes to a vapor, and heat is added to the refrigerant by the auxiliary heat exchanger 250. (In this mode, the valves 464 and 462 direct the auxiliary fluid to the coil 262 in the septic tank 260 so that the auxiliary fluid picks up heat from the fluid 261. This heat is used to heat the refrigerant in the auxiliary heat exchanger 250. The valves 464 and 462 prevent the auxiliary fluid from being cooled by the water preheat exchanger 450.) The three-way preheat valve 516 and the first three-way defrost valve 506 then direct the refrigerant to the defrost line 312, and then to the suction 181 of the compressor 142. The heat extracted from the fluid 261 in the septic tank 260 is thus used to defrost the coils of the outdoor exchanger 130, without extracting heat from the indoor environmental space "E".

Figure 10:
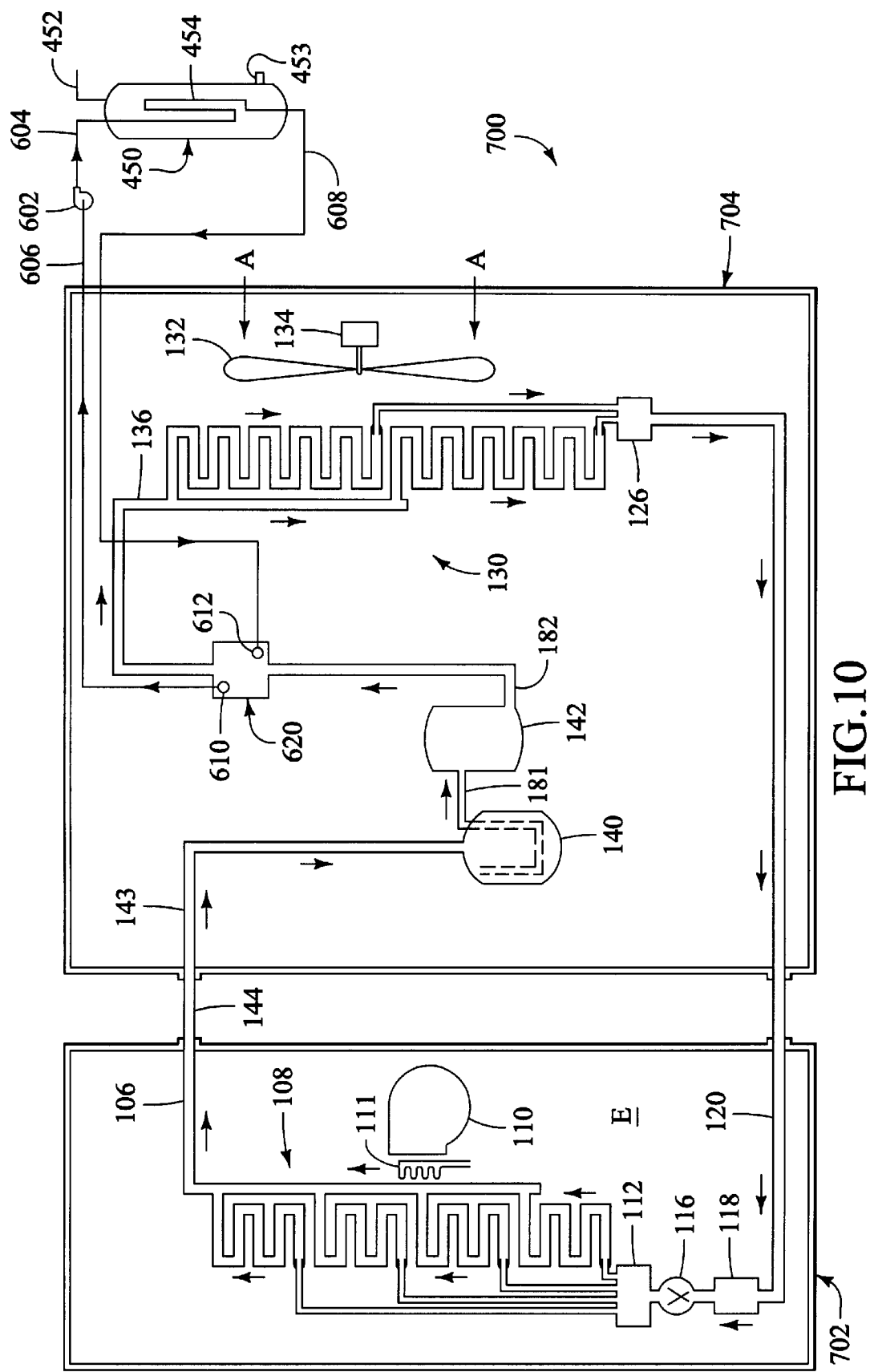
FIG. 10 is a schematic diagram of an air conditioner in accordance with a second embodiment of the present invention, and incorporating a water preheat system.

Turning now to FIG. 10, a second embodiment of the present invention is depicted in a schematic diagram. This embodiment includes an air conditioner 700 having an auxiliary cooling source, or heat sink, for cooling the refrigerant which is circulated in the air conditioner to extract heat from an environmental space "E". The air conditioner 700 is in many respects similar to the heat pump 200 depicted in FIG. 3. Components which are like numbered between these two figures (FIGS. 3 and 10) essentially operate and function in similar manners. However, as is evident, the air conditioner 700 is not configurable to add heat to the indoor environmental space "E", and accordingly a reversing valve (138 of FIG. 3) is not provided, nor is an outdoor thermal expansion valve (256, FIG. 3), an indoor check valve (114, FIG. 3), or an outdoor check valve (128, FIG. 3). The improvement to the air conditioner 700 of FIG. 10 over prior art air conditioners is the addition of the water preheat system at the compressor discharge 182. The water preheat system is similar to the water preheat system described with respect to the heat pump 300 of FIG. 4, in that the refrigerant is used to preheat water intended for warm or hot water service. The preheating of the water with the refrigerant lowers the temperature of the refrigerant, and can therefore alternately be considered as a "refrigerant pre-cooler". Since the temperature of the refrigerant is typically lowered as a result of the water preheat system, the refrigerant will have more thermal capacity to withdraw heat from the indoor environmental space "E".

The air conditioner 700 of FIG. 10 has an indoor unit 702 to cool an indoor environmental space "E", and an outdoor unit 704, which is used to expel heat (energy) from the refrigerant circulating in the air conditioner 700. The outdoor unit includes a compressor 142 having a compressor inlet 181 and a compressor outlet 182, and an evaporator (outdoor heat exchanger 130). The indoor unit 402 has a condenser (indoor heat exchanger 108), and a thermal expansion valve 116. The water preheat system includes an auxiliary heat exchanger 620, an auxiliary fluid line (collectively, 606, 604, and 608, and including coils 454), and an auxiliary fluid pump 602. The compressor outlet 182, the auxiliary heat exchanger 620, the condenser 130, the thermal expansion valve 116, the evaporator 108, and the compressor inlet 181 are placed in respective serial fluid communication with one another to thereby circulate a refrigerant fluid through the heat pump 700. The auxiliary fluid pump 602 is configured to circulate an auxiliary heat transfer fluid through the auxiliary fluid lines 606, 604, 454 and 608 (and the auxiliary heat exchanger 620). The auxiliary heat exchanger 620 is configured to exchange heat between the refrigerant fluid and the auxiliary heat transfer fluid (i.e., heat is typically transferred from the refrigerant to the auxiliary transfer fluid). The auxiliary fluid line, or at least the coil portion 454 thereof, is in thermal energy communication with a heat sink source. Typically, the heat sink source is cold or cool water, and the heat transfer between the water and the auxiliary heat transfer fluid occurs in a water preheat heat exchanger 450. More preferably, the water is water that is intended to be further heated after being preheated in the water preheat exchanger. For example, cool water can enter the preheat exchanger 450 at inlet line 452 and circulate through the exchanger 450, exiting at outlet line 453. As the water passes through the exchanger 450, heat is transferred from the auxiliary transfer fluid to the water via the coils 454, thus cooling the auxiliary fluid. The cooled auxiliary fluid is then used to cool the refrigerant which circulates in the air conditioner 700. This cooling of the refrigerant is performed using the auxiliary heat exchanger 620. The preheated water can then be further heated and used for residential purposes (bathing, dish washing, etc.) or commercial purposes.

In one variation on the air conditioner 700 of FIG. 10, when a septic tank or any other source containing a relatively cool fluid is available, the fluid in the septic tank (rather than water for preheat) can be used to cool the auxiliary heat transfer fluid.

Figure 11:
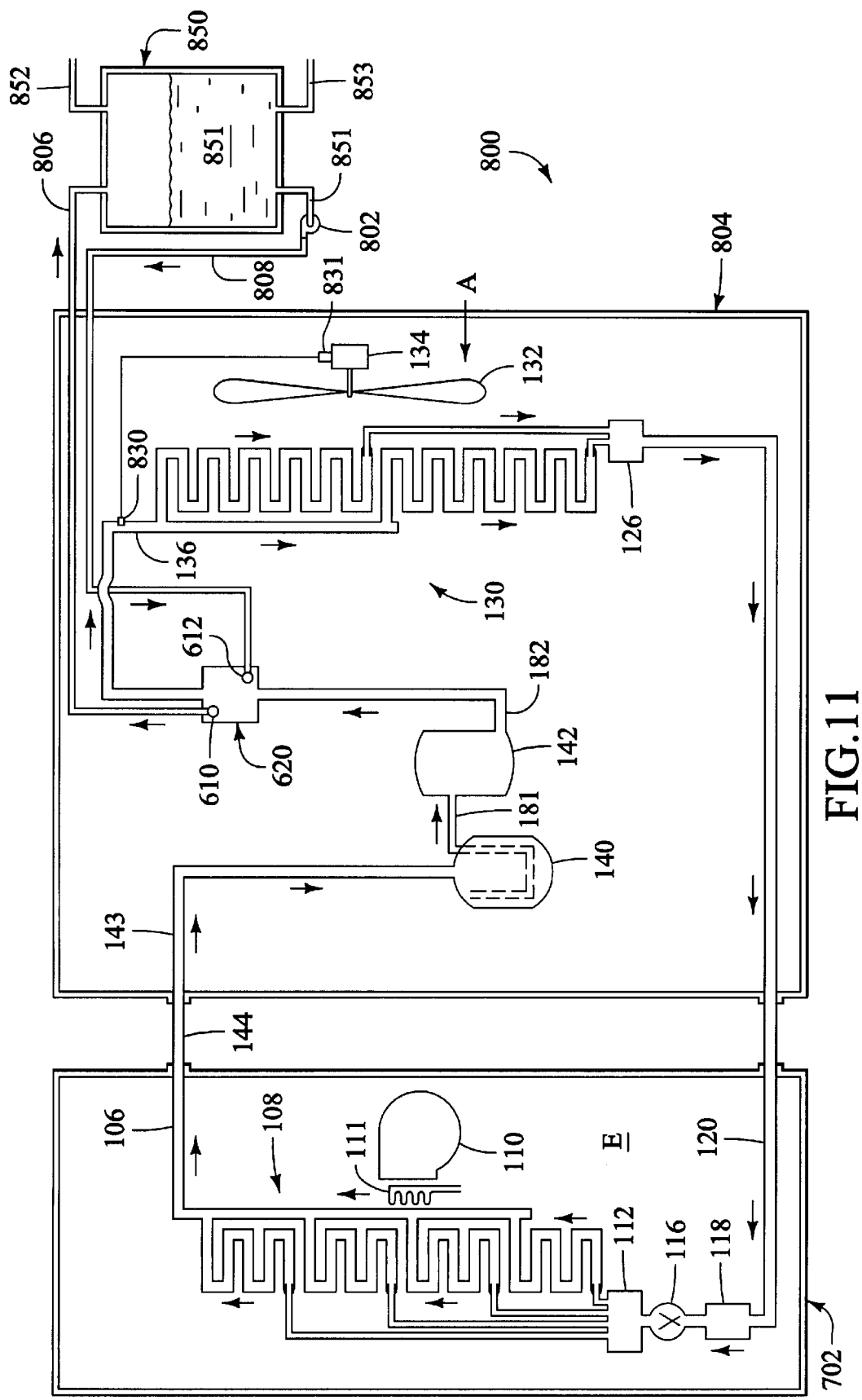
FIG. 11 is a schematic diagram of a variation of the air conditioner of FIG. 10 using a liquid heat sink to pre-cool refrigerant.

A further variation on the air conditioner 700 of FIG. 10 is depicted in FIG. 11. The air conditioner system 800 of FIG. 11 is similar to the air conditioner 700 previously described, and like numbered components act in the same or a similar manner. The air conditioner system 800 of FIG. 11 differs from the air conditioner 700 of FIG. 10 primarily in that the auxiliary heat transfer fluid is the heat sink fluid. That is, rather than using a first heat exchanger (such as preheat exchanger 450 of FIG. 10) in conjunction with the auxiliary heat exchanger 610, only the preheat heat exchanger is used. For example, a fluid, such as waste water 451, can be contained in a tank or a reservoir 850. This fluid will be known as the "heat sink fluid" since it acts as a source to which heat from refrigerant circulating in the air conditioning system 800 can be transferred. The heat sink fluid 851 enters the tank 850 from a main inlet line 852, and is withdrawn from the tank by a primary outlet line 853. A secondary outlet line 851 is connected to a heat sink fluid pump 802, which pumps the heat sink fluid through the auxiliary heat exchanger 620 via line 808. The heat sink fluid extracts heat from the refrigerant in the auxiliary heat exchanger 620, and the heat sink fluid then returns to the tank 850 via line 806.

One example of a heat sink fluid which can be used in the air conditioner 800 of FIG. 11 is industrial waste water or other liquid product streams which are generated by one or more industrial processes. When such a liquid stream is available, and has the capacity to remove thermal energy from the refrigerant via the auxiliary exchanger 620, the liquid stream can be used to pre-chill the refrigerant in the air conditioner system before the refrigerant enters the condenser 130. Such heat sink fluids can be corrosive in nature, and so the liquid transfer lines 806 and 808, and the heat exchange surfaces (not shown) in auxiliary exchanger 620, are preferably fabricated from a material designed to resist corrosion by the heat sink fluid.

The outdoor unit 804 of the air conditioner 800 can also be provided with a temperature sensor 830 located in the refrigerant inlet line to the condenser 130. The temperature sensor 830 can be in communication with a temperature switch 831 connected to fan motor 134. The temperature switch 831 can be configured to stop the fan motor 134 when the temperature of the refrigerant entering the condenser 130 is at or below a predetermined temperature. This can result in a savings of energy.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A heat pump comprising:
 a compressor having a compressor inlet and a compressor outlet;
 an indoor heat exchanger and an outdoor heat exchanger;
 an outdoor thermal expansion valve;
 an auxiliary heat exchanger;
 an auxiliary fluid line;
 an auxiliary fluid pump; and
 wherein;
  the compressor outlet, the indoor heat exchanger, the outdoor thermal expansion valve, the auxiliary heat exchanger, the outdoor heat exchanger, and the compressor inlet can be placed in respective serial fluid communication with one another to thereby circulate a refrigerant fluid;

the auxiliary fluid pump is configured to circulate an auxiliary heat transfer fluid through the auxiliary fluid line;

the auxiliary heat exchanger is configured to exchange heat between the refrigerant fluid and the auxiliary heat transfer fluid;

the auxiliary fluid line is in thermal energy communication with a primary source of auxiliary heat;

a septic tank, and wherein the septic tank is configured to contain a fluid which provides the primary source of auxiliary heat;

a fan configured to force atmospheric air past the outdoor heat exchanger to thereby facilitate heat transfer to the atmospheric air from the refrigerant passing through the outdoor heat exchanger;

a motor for driving the fan;

a refrigerant thermal sensor configured to detect a temperature of the refrigerant passing from the auxiliary heat exchanger to the outdoor heat exchanger and to generate a temperature signal in response thereto; and a fan motor thermal switch to receive the temperature signal and to stop the motor when the signal indicates that the temperature of the refrigerant passing from the auxiliary heat exchanger to the outdoor heat exchanger is above a predetermined level.

2. A heat pump comprising:

a compressor having a compressor inlet and a compressor outlet;

an indoor heat exchanger and an outdoor heat exchanger;

an outdoor thermal expansion valve;

an auxiliary heat exchanger;

an auxiliary fluid line;

an auxiliary fluid pump; and wherein;

the compressor outlet, the indoor heat exchanger, the outdoor thermal expansion valve, the auxiliary heat exchanger, the outdoor heat exchanger, and the compressor inlet can be placed in respective serial fluid communication with one another to thereby circulate a refrigerant fluid;

the auxiliary fluid pump is configured to circulate an auxiliary heat transfer fluid through the auxiliary fluid line;

the auxiliary heat exchanger is configured to exchange heat between the refrigerant fluid and the auxiliary heat transfer fluid;

the auxiliary fluid line is in thermal energy communication with a primary source of auxiliary heat;

a septic tank, and wherein the septic tank is configured to contain a fluid which provides the primary source of auxiliary heat;

a septic tank thermal sensor configured to detect a temperature of the fluid within the septic tank and to generate a temperature signal in response thereto; and an auxiliary fluid pump thermal switch to receive the temperature signal and to stop the auxiliary fluid pump when the signal indicates that the temperature of the fluid within the septic tank is below a predetermined level.

* * * * *